(12) United States Patent
Nakada et al.

(10) Patent No.: US 9,893,613 B1
(45) Date of Patent: Feb. 13, 2018

(54) DC/DC CONVERTER

(71) Applicant: Mitsubishi Electric Corporation, Tokyo (JP)

(72) Inventors: Mai Nakada, Tokyo (JP); Ryota Kondo, Tokyo (JP); Matahiko Ikeda, Tokyo (JP); Yuya Tanaka, Tokyo (JP); Shingo Kato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/637,593

(22) Filed: Jun. 29, 2017

(30) Foreign Application Priority Data

Jul. 29, 2016 (JP) .................................. 2016-149188
Dec. 6, 2016 (JP) .................................. 2016-236352

(51) Int. Cl.
| H02M 3/158 | (2006.01) |
| H02M 3/142 | (2006.01) |
| H02M 3/07 | (2006.01) |
| H02M 3/139 | (2006.01) |
| H02M 3/18 | (2006.01) |

(52) U.S. Cl.
CPC ............. *H02M 3/142* (2013.01); *H02M 3/07* (2013.01); *H02M 3/139* (2013.01); *H02M 3/18* (2013.01); *H02M 3/158* (2013.01); *H02M 3/1582* (2013.01); *H02M 2003/1586* (2013.01)

(58) Field of Classification Search
CPC . H02M 2003/1552; H02M 2001/4283; H02M 2001/4291; H02M 1/12; H02M 1/42; H02M 1/4225; H02M 1/4233; H02M 1/4241; H02M 1/4258; H02M 1/425; H02M 1/4208
USPC .......................... 323/205, 207, 222, 263, 289
See application file for complete search history.

(56) References Cited

U.S. PATENT DOCUMENTS

2013/0119961 A1* 5/2013 Okuda .................. H02M 3/158
323/299

FOREIGN PATENT DOCUMENTS

JP          5457559 B2     4/2014

* cited by examiner

*Primary Examiner* — Timothy J Dole
*Assistant Examiner* — Bryan R Perez
(74) *Attorney, Agent, or Firm* — Sughrue Mion, PLLC; Richard C. Turner

(57) ABSTRACT

To provide a DC/DC converter which does not need to switch a change direction of a control value depending on a power transmission direction between low voltage side and high voltage side, and can control a voltage of a charge and discharge capacitor. A DC/DC converter which controls voltage of a charge and discharge capacitor by a controller that performs a Δduty control which changes an ON duty ratio difference of semiconductor circuits, and a phase shift control which changes a phase difference of an ON period of semiconductor circuits.

17 Claims, 16 Drawing Sheets

MODE 1

MODE 2

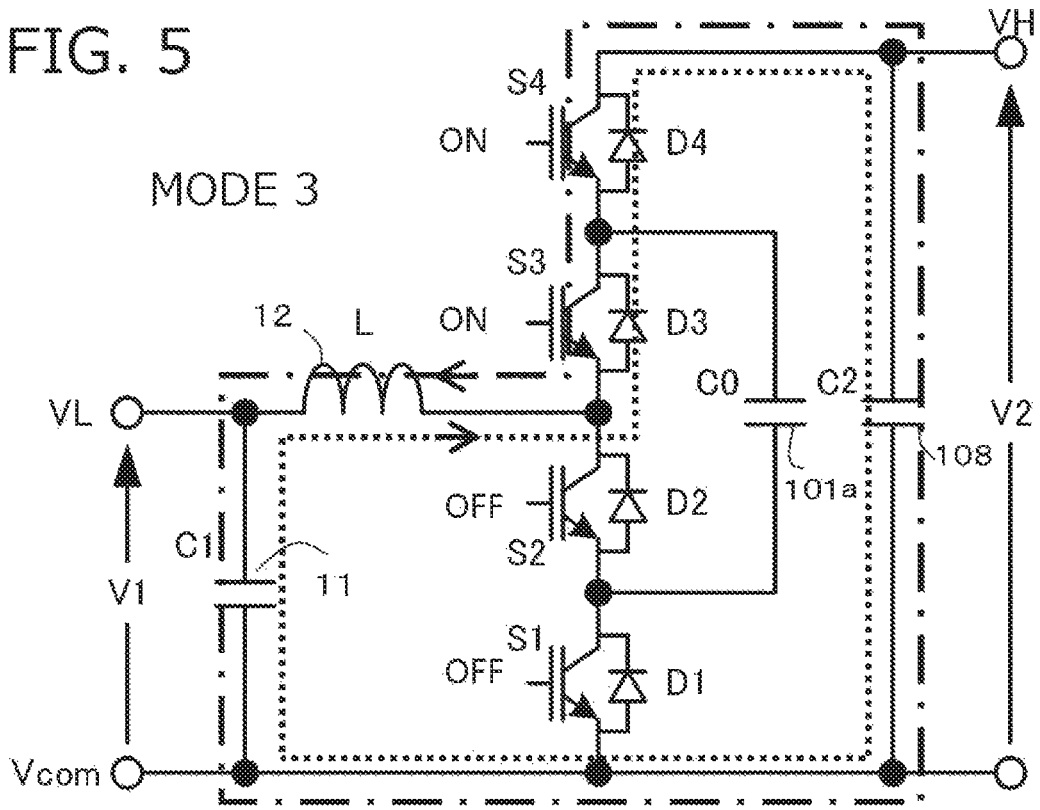
FIG. 5 MODE 3
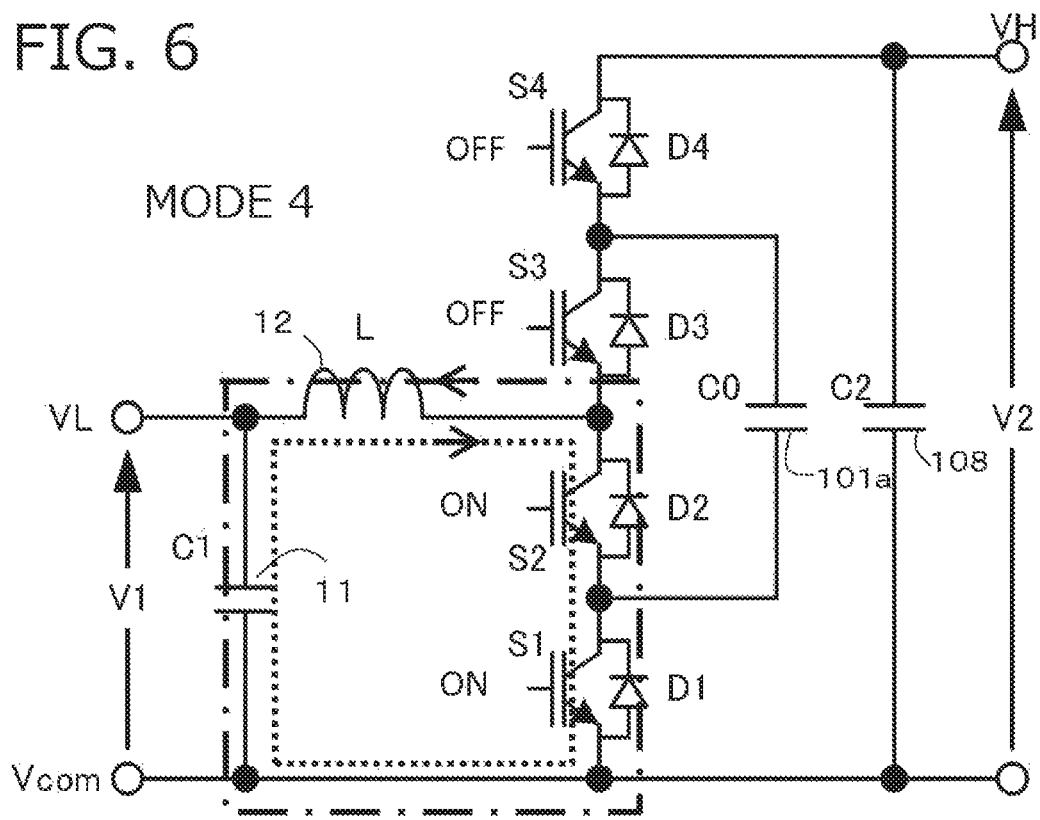
FIG. 6 MODE 4

DC/DC CONVERTER

INCORPORATION BY REFERENCE

The disclosure of Japanese Patent Application No. 2016-149188 filed on Jul. 29, 2016 and Japanese Patent Application No. 2016-236352 filed on Dec. 6, 2016 including those specifications, claims and drawings, is incorporated herein by reference in its entirety.

BACKGROUND

The present invention relates to a DC/DC converter. The DC/DC converter described in Japanese Patent Publication No. 5457559 (JP 5457559 B) is known. In the technology of JP 5457559 B, by controlling the switching operation of switching devices, the accumulation amount and the emission amount of energy to the reactor are controlled, voltage is stepped up from low voltage side to high voltage side, and power is transmitted, or voltage is stepped down from high voltage side to low voltage side, and power is transmitted. The DC/DC converter has a subject that the reactor enlarges and becomes heavy. In order to reduce the size and weight of the reactor, it is conceivable to reduce the voltage applied to the reactor and to reduce the inductance value required for the reactor. In the technology of JP 5457559 B, the first to the fourth switching devices connected in series are provided; and the charge and discharge capacitor, which is connected between the intermediate connection point of the first and the second switching devices and the intermediate connection point of the third and fourth switching devices, is provided. Then, by changing the duty factor of the first switching device and the duty factor of the second switching device in the opposite direction mutually, it is configured to control the voltage of the charge and discharge capacitor to the target voltage. By controlling the voltage of the charge and discharge capacitor to the target voltage, the voltage applied to the reactor is reduced and the size and weight of the reactor are reduced.

SUMMARY

However, in the technology of JP 5457559 B, it is necessary to switch the change direction of the duty factor, depending on the power transmission direction between low voltage side and high voltage side. Specifically, in the case of stepping up from low voltage side to high voltage side and transmitting power, in order to increase the voltage of the charge and discharge capacitor, it is necessary to increase the duty factors of the first and the third switching devices more than the duty factors of the second and the fourth switching devices, so as to increase the charging time of the charge and discharge capacitor more than the discharging time; on the other hand, in order to decrease the voltage of the charge and discharge capacitor, it is necessary to decrease the duty factors of the first and the third switching devices less than the duty factors of the second and the fourth switching devices, so as to increase the discharging time of the charge and discharge capacitor more than the charging time.

On the other hand, in the case of stepping down from high voltage side to low voltage side and transmitting power, in order to increase the voltage of the charge and discharge capacitor, it is necessary to decrease the duty factors of the first and the third switching devices less than the duty factors of the second and the fourth switching devices; on the other hand, in order to decrease the voltage of the charge and discharge capacitor, it is necessary to increase the duty factors of the first and the third switching devices more than the duty factors of the second and the fourth switching devices.

In the technology of JP 5457559 B, it is configured to determine the power transmission direction between low voltage side and high voltage side by the current direction flowing through the reactor. However, when the current sensor for detecting the current of the reactor has an error, the current direction flowing through the reactor in low power cannot be detected correctly. Accordingly, in the technology of JP 5457559 B, in low power, it was difficult to determine the power transmission direction momentarily with sufficient accuracy.

Therefore, in the technology of JP 5457559 B, in low power, the power transmission direction is determined incorrectly, and the duty factor of each switching device is increased or decreased in the wrong direction; there was a possibility that the voltage of the charge and discharge capacitor deviates from the target voltage. Consequently, since there is a possibility that excess voltage is applied to the first to the fourth switching devices, it is necessary to use the high breakdown voltage device for the first to the fourth switching devices; as a result, there has been a problem that cost and volume of the DC/DC converter increase.

Thus, it is desirable to provide a DC/DC converter which does not need to switch the change direction of a control value depending on the power transmission direction between low voltage side and high voltage side and can control the voltage of the charge and discharge capacitor.

A DC/DC converter according to the present invention includes:

a low-voltage side capacitor which holds low side voltage; a high-voltage side capacitor which holds high side voltage, and whose a negative electrode side terminal was connected to a negative electrode side terminal of the low-voltage side capacitor; a first semiconductor circuit whose a first end was connected to the negative electrode side terminal of the low-voltage side capacitor; a second semiconductor circuit whose a first end was connected to a second end of the first semiconductor circuit, and whose a second end was connected to a positive electrode side terminal of the low-voltage side capacitor via a reactor; a third semiconductor circuit whose a first end was connected to the second end of the second semiconductor circuit; a fourth semiconductor circuit whose a first end was connected to a second end of the third semiconductor circuit, and whose a second end was connected to a positive electrode side terminal of the high-voltage side capacitor; a charge and discharge capacitor whose a first end was connected to an intermediate connection point between the first semiconductor circuit and the second semiconductor circuit, and whose a second end was connected to an intermediate connection point between the third semiconductor circuit and the fourth semiconductor circuit; and a controller that controls each of the semiconductor circuits, wherein the DC/DC converter is capable of operation of one or both of a step-up operation which converts an inputted voltage of the low-voltage side capacitor into a stepped up voltage and outputs to the high-voltage side capacitor by an on-off switching function of the switching element of the first and second semiconductor circuits, by having a function of a switching element in each of the first and second semiconductor circuits and having a function of a diode element in each of the third and fourth semiconductor circuits, and a step-down operation which converts an inputted voltage of the high-voltage side capacitor into a stepped down voltage and outputs to the low-voltage side capacitor by an on-off switching function of the switching element of the third and fourth semiconductor circuits, by having a function of a switching element in each of the third and fourth semiconductor circuits and having a function of a diode element in each of the first and second semiconductor circuits, wherein the controller controls an ON duty ratio and a phase of ON period in each of the semiconductor circuits of one or both of the first and second semiconductor circuits which have the on-off switching function, and the third and fourth semiconductor circuits which have the on-off switching function, and wherein the controller controls a voltage of the charge and discharge capacitor, by performing a Δduty control which performs one or both of a first ON duty ratio difference change which changes an ON duty ratio difference between the ON duty ratio of the first semiconductor circuit and the ON duty ratio of the second semiconductor circuit, and a second ON duty ratio difference change which changes an ON duty ratio difference between the ON duty ratio of the third semiconductor circuit and the ON duty ratio of the fourth semiconductor circuit, and a phase shift control which performs one or both of a first phase difference change which changes a phase difference between the phase of ON period of the first semiconductor circuit and the phase of ON period of the second semiconductor circuit, and a second phase difference change which changes a phase difference between the phase of ON period of the third semiconductor circuit and the phase of ON period of the fourth semiconductor circuit.

According to the DC/DC converter of the present invention, the voltage of the charge and discharge capacitor is controlled by execution of the phase shift control which changes the phase difference of the ON period of each semiconductor circuit. In the phase shift control, it is possible to control the voltage of the charge and discharge capacitor without the need for switching the change direction of the phase difference depending on the power transmission direction between low voltage side and high voltage side. Accordingly, even in low power with low power transmission amount, the voltage of the charge and discharge capacitor can be controlled with sufficient accuracy. The voltage of the charge and discharge capacitor is controlled by execution of the Δduty control which changes the ON duty ratio difference of each semiconductor circuit. Accordingly, by combining the phase shift control and the Δduty control appropriately, the controllability of the voltage of the charge and discharge capacitor can be improved. Therefore, the breakdown voltage performance of the switching devices can be reduced and the cost and size of the DC/DC converter can be reduced.

BRIEF DESCRIPTION OF THE DRAWINGS

FIG. 5 is an explanation drawing showing an operation mode 3 of a DC/DC converter according to Embodiment 1 of the present invention;

FIG. 6 is an explanation drawing showing an operation mode 4 of a DC/DC converter according to Embodiment 1 of the present invention;

DETAILED DESCRIPTION OF THE EMBODIMENTS

Embodiment 1

Figure 1:
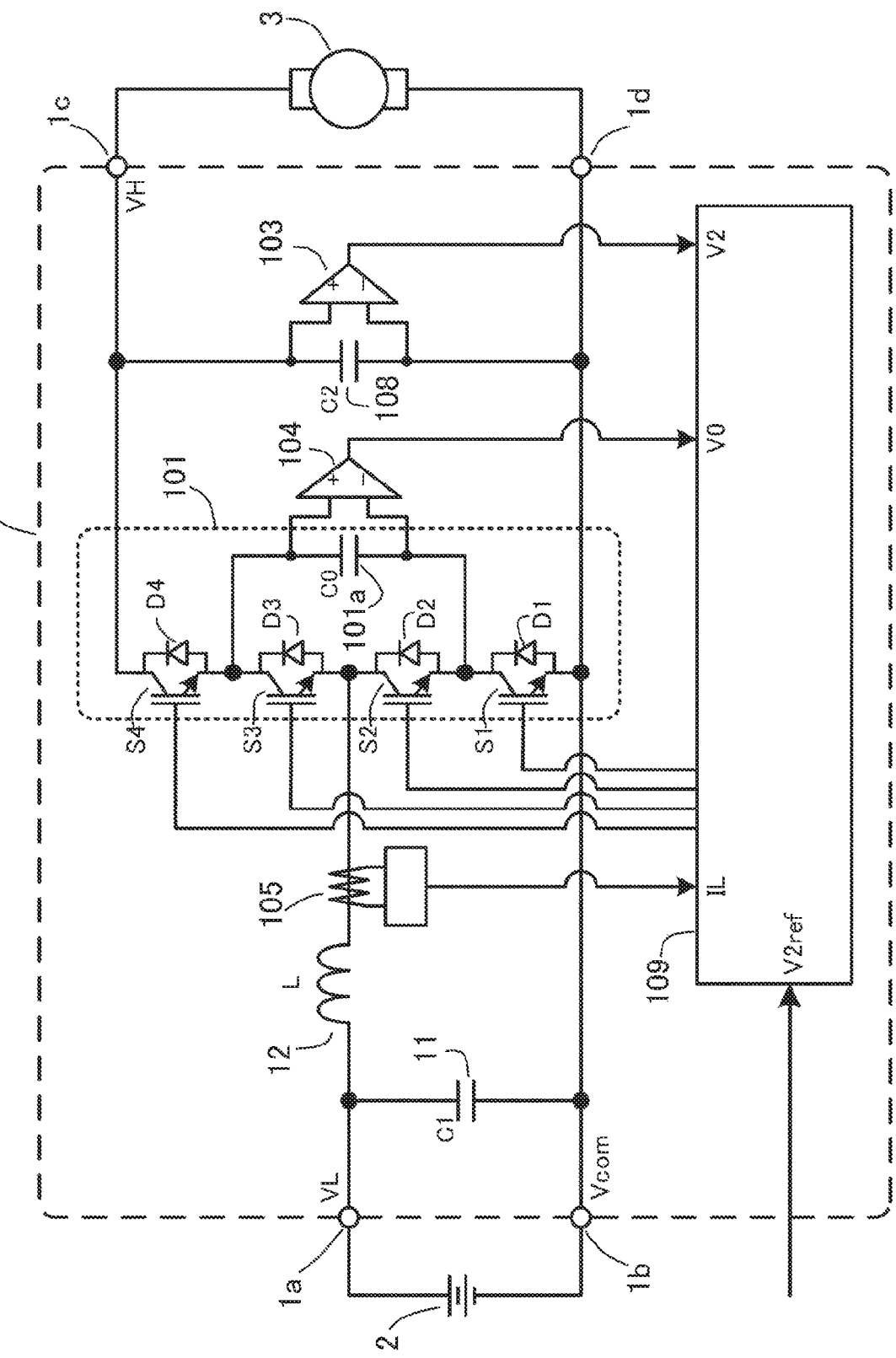
FIG. 1 is a configuration diagram of a DC/DC converter according to Embodiment 1 of the present invention.
Figure 2:
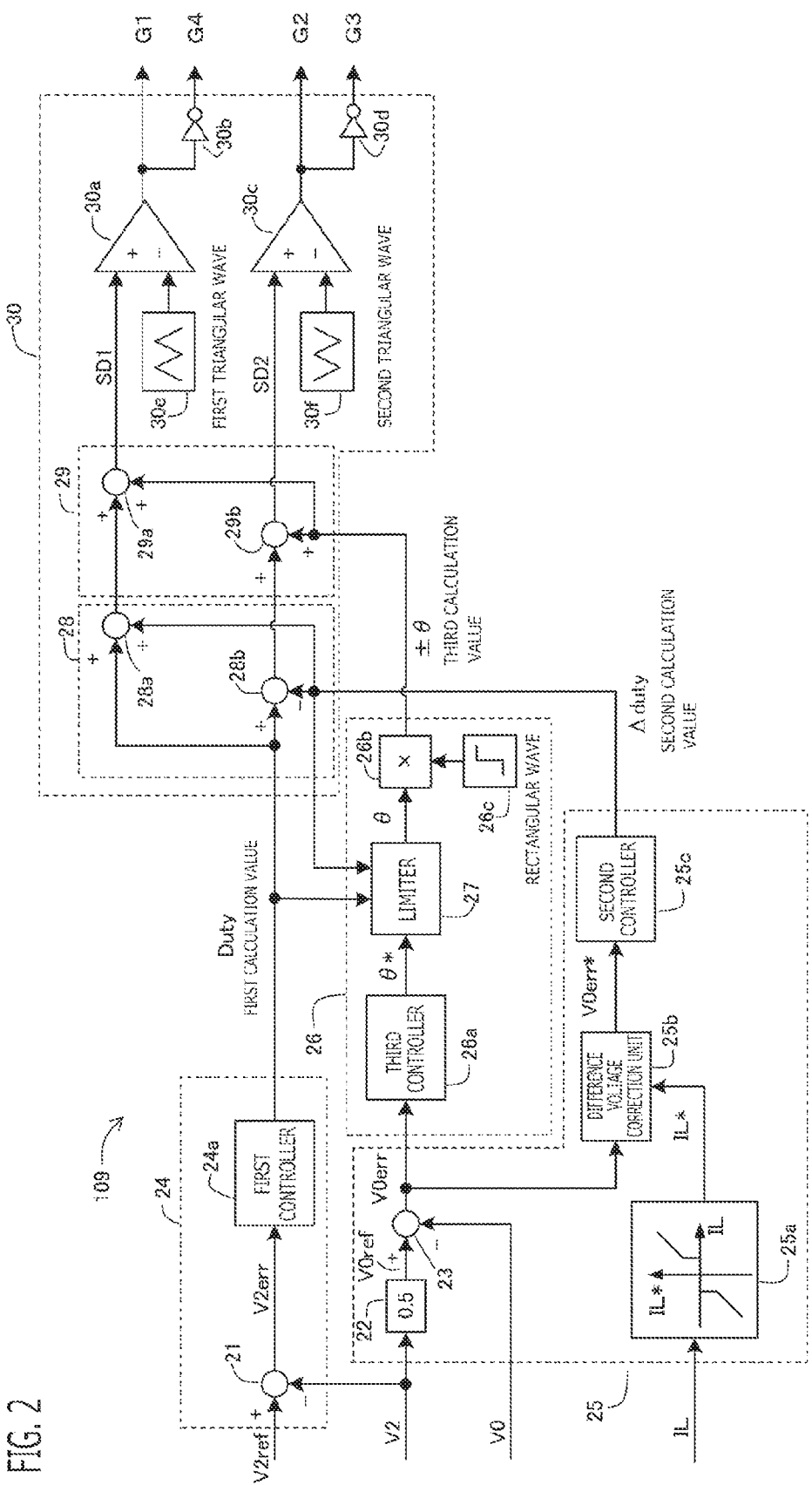
FIG. 2 is a circuit diagram showing a configuration of a controller according to Embodiment 1 of the present invention.
Figure 9:
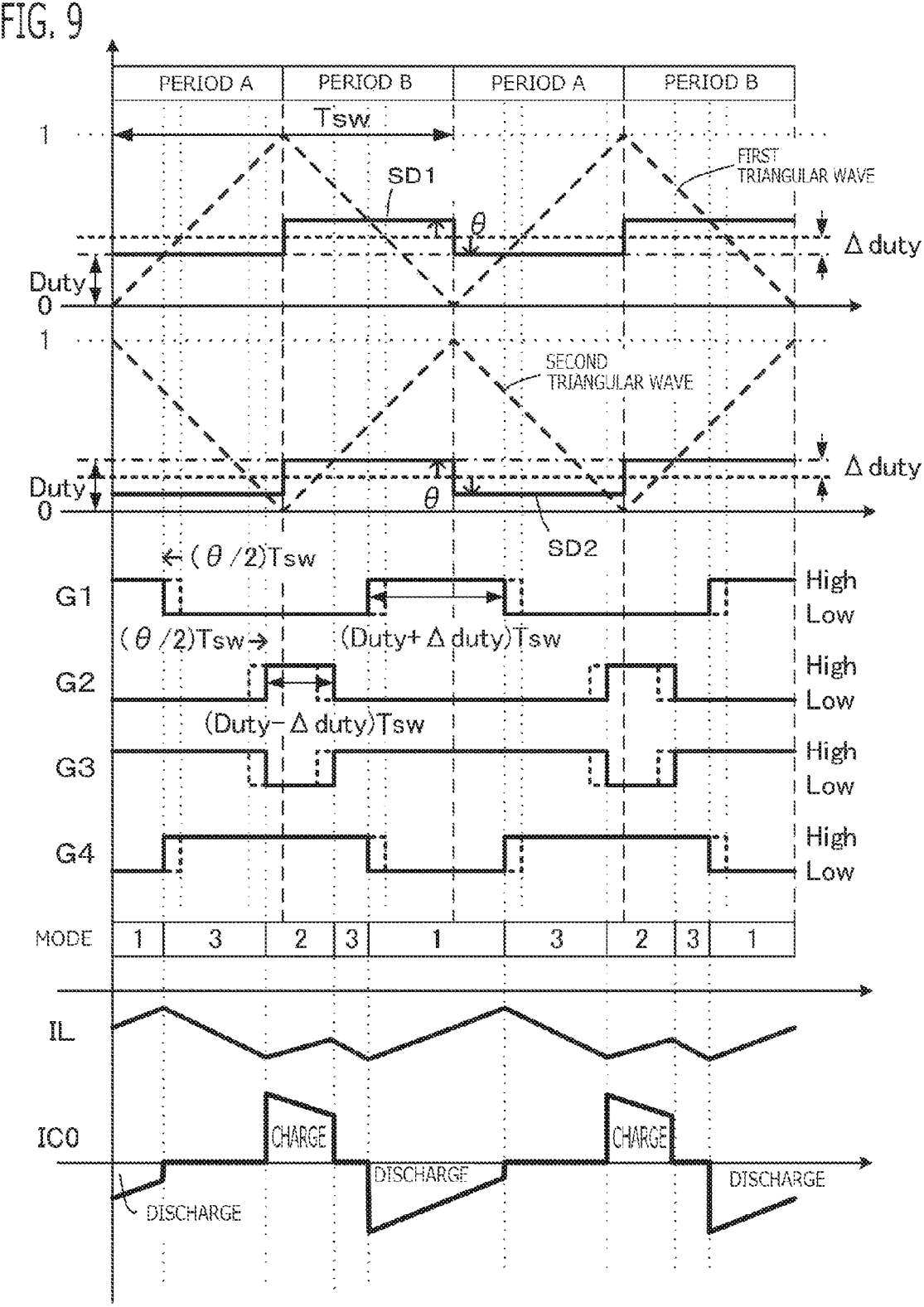
FIG. 9 is an explanation drawing of a DC/DC converter in the case where a step-down ratio is less than twice according to Embodiment 1 of the present invention.
Figure 10:
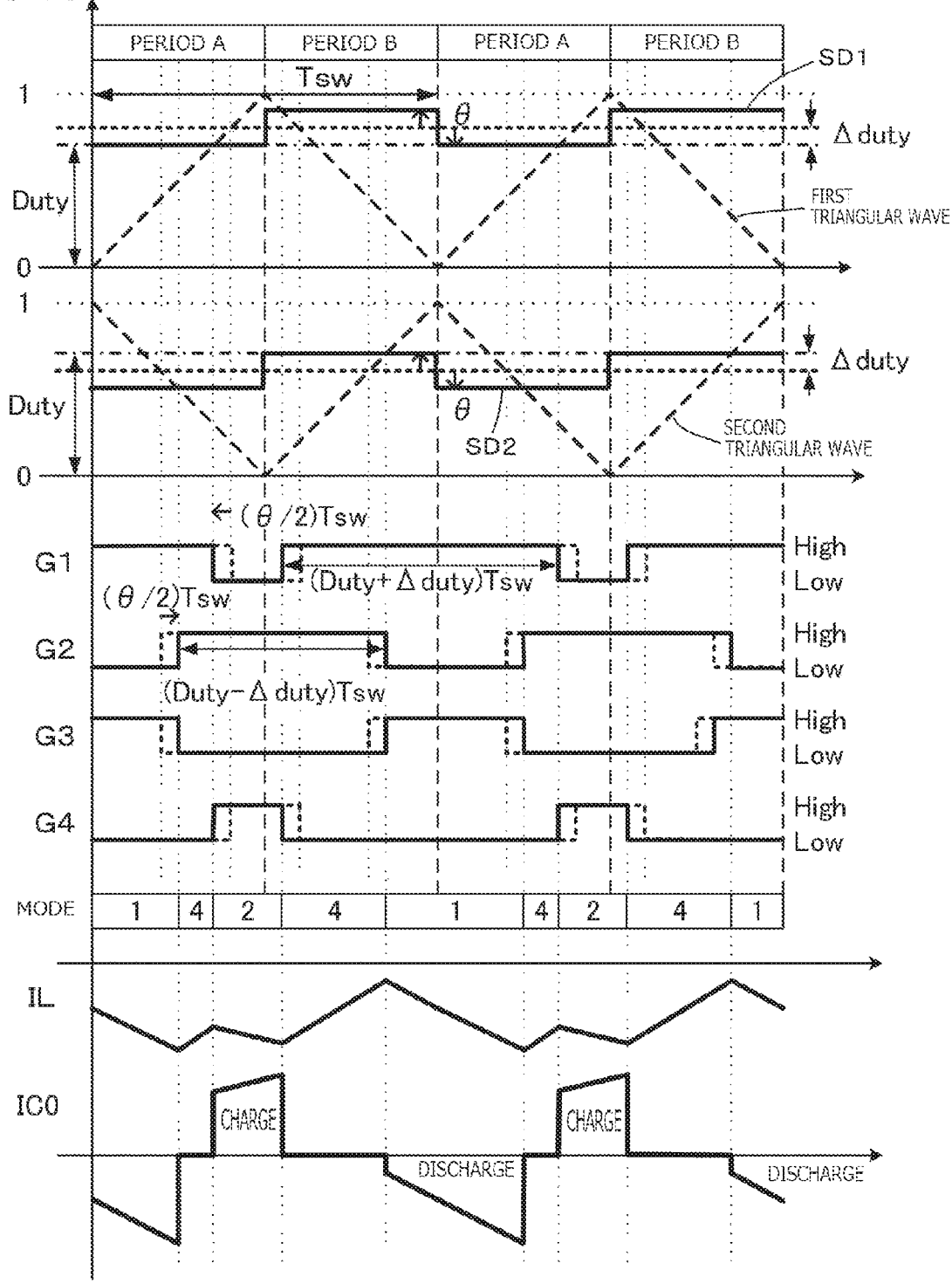
FIG. 10 is an explanation drawing of a DC/DC converter in the case where a step-down ratio is greater than or equal to twice according to Embodiment 1 of the present invention.
Figure 11:
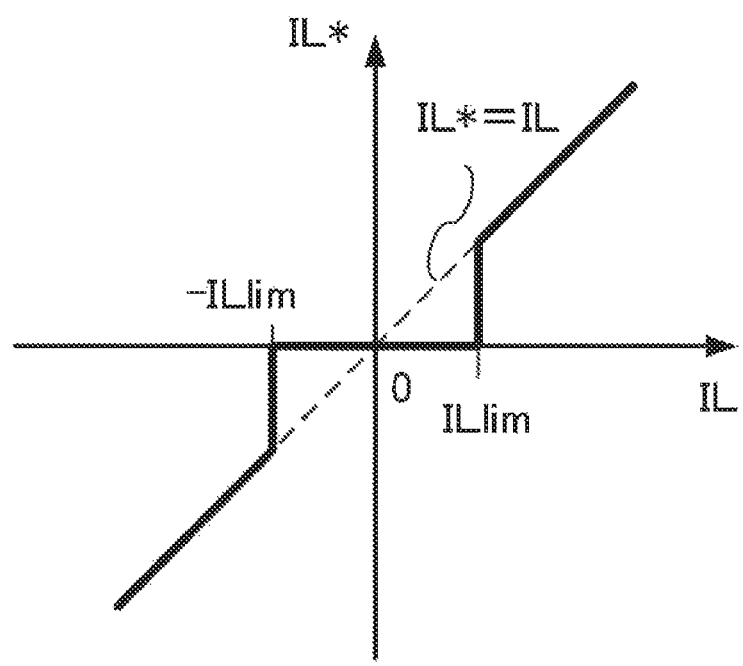
FIG. 11 is a related figure showing a process of a current limiting unit according to Embodiment 1 of the present invention.
Figure 12:
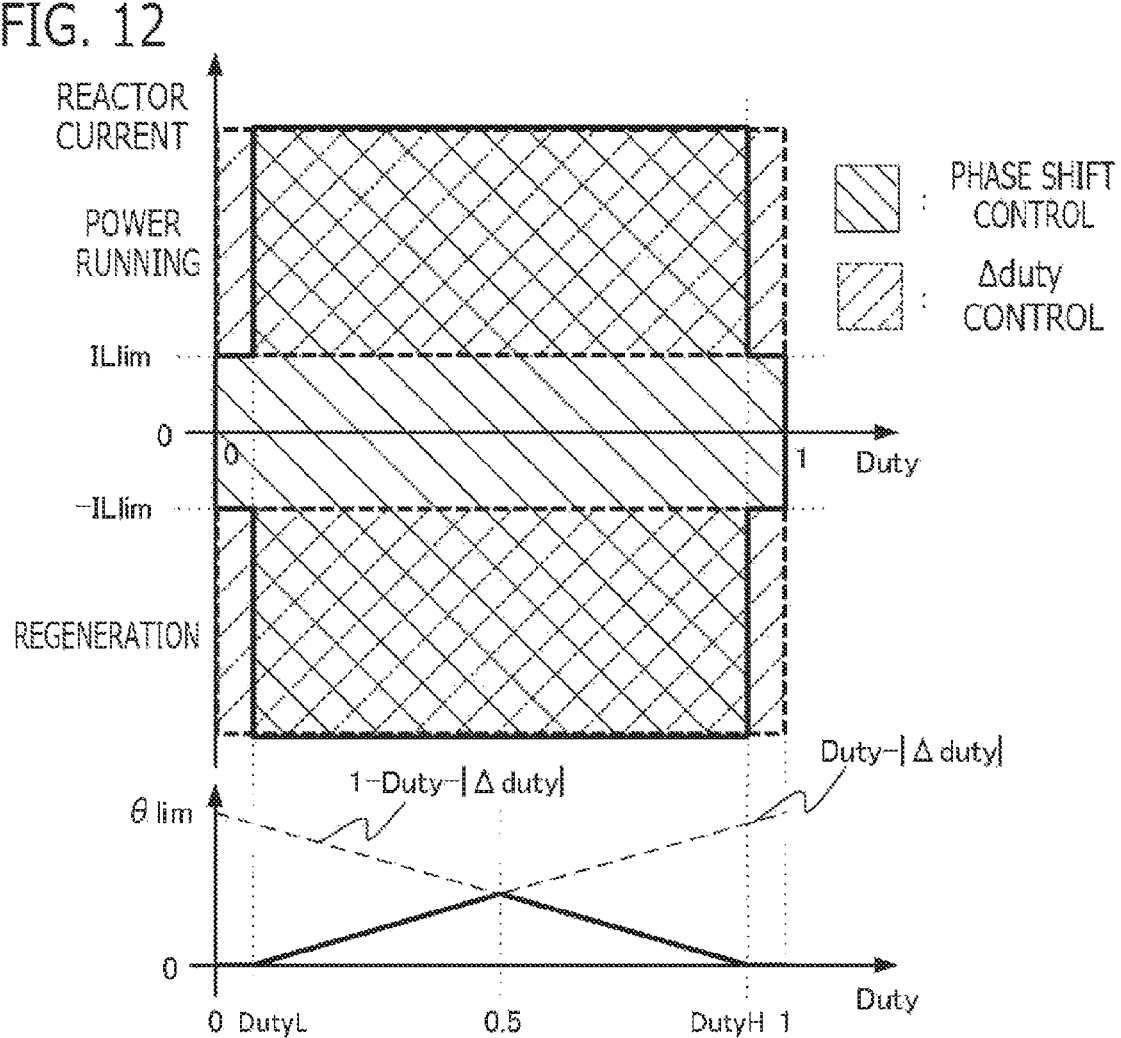
FIG. 12 is an explanation drawing showing an execution region of a second calculation unit and a third calculation unit, and a limiting value of a limiter according to Embodiment 1 of the present invention.

A DC/DC converter 1 according to Embodiment 1 will be explained with reference to drawings. FIG. 1 is a configuration diagram showing a configuration of the DC/DC converter 1; FIG. 2 is a circuit diagram (a block diagram) showing a configuration of a controller 109 of FIG. 1; FIG. 3 to FIG. 6 are explanation drawings showing operation modes of the DC/DC converter 1 of FIG. 1. FIG. 7 to FIG. 10 are explanation drawings of operation of the DC/DC converter 1 of FIG. 1. FIG. 11 is an explanation drawing of operation of a current limiting unit 25a of the controller 109 of FIG. 2. FIG. 12 is an explanation drawing of operating range of the controller 109 of FIG. 2 and operation of a limiter.

1. Schematic Configuration of DC/DC Converter 1

As shown in FIG. 1, the DC/DC converter 1 is provided with four terminals 1a, 1b, 1c, 1d as a terminal group. The DC/DC converter 1 steps up an input voltage V1, as a low side voltage of a direct current inputted between an input side positive electrode terminal 1a (VL) and an input side negative electrode terminal 1b (Vcom), to a voltage greater than or equal to the input voltage V1, and outputs an output voltage V2, as a high side voltage after stepping up, to a part between an output side positive electrode terminal 1c (VH) and an output side negative electrode terminal 1d. In the present embodiment, a battery 2 is connected between the input side positive electrode terminal 1a and the input side negative electrode terminal 1b, and an electric motor 3 is connected between the output side positive electrode terminal 1c and the output side negative electrode terminal 1d. The input side negative electrode terminal 1b and the output side negative electrode terminal 1d are connected to each other by a wire.

The DC/DC converter 1 is provided with an input side smoothing capacitor 11 as a low voltage side capacitor, a reactor 12, a DC voltage converter 101 as a series circuit of semiconductor circuits, a first voltage sensor 103, a second voltage sensor 104, a current sensor 105 as a reactor current detection unit, an output side smoothing capacitor 108 as a high voltage side capacitor, and a controller 109.

A first terminal of the input side smoothing capacitor 11 is connected to the input side positive electrode terminal 1a, and a second terminal is connected to the input side negative electrode terminal 1b; the input side smoothing capacitor 11 smooths and holds the input voltage V1. A first terminal of the output side smoothing capacitor 108 is connected to the output side positive electrode terminal 1c, and a second terminal is connected to the output side negative electrode terminal 1d; the output side smoothing capacitor 108 smooths and holds the output voltage V2. A first end of the reactor 12 is connected to the positive electrode side terminal of the input side smoothing capacitor 11 and the input side positive electrode terminal 1a, and second end is connected to the DC voltage converter 101; the reactor 12 is used for energy storage.

The DC voltage converter 101 is provided with a first to fourth semiconductor circuits which are serially connected, and a charge and discharge capacitor 101a. The DC voltage converter 101 is capable of a step-up operation which steps up the input voltage V1 to the output voltage V2, and a step-down operation which steps down the output voltage V2 to the input voltage V1. In the present embodiment, as a first semiconductor circuit, a first switching device S1, and a first diode D1 which is connected in inverse parallel with the first switching device S1 are provided; as a second semiconductor circuit, a second switching device S2, and a second diode D2 which is connected in inverse parallel with the second switching device S2 are provided; as a third semiconductor circuit, a third switching device S3, and a third diode D3 which is connected in inverse parallel with the third switching device S3 are provided; and as a fourth semiconductor circuit, a fourth switching device S4, and a fourth diode D4 which is connected in inverse parallel with the fourth switching device S4 are provided. In this way, all of the first to the fourth semiconductor circuits have a switching function, and a function of a diode element. For each switching device S1 to S4, for example, IGBT (Insulated Gate Bipolar Transistor) is used; when each gate signal G1 to G4 inputted into each switching device is High, each switching device S1 to S4 is turned on (closed circuit state), and when each gate signal G1 to G4 is low, each switching device S1 to S4 is turned off (open circuit state).

The fourth switching device S4, the third switching device S3, the second switching device S2, and the first switching device S1 are serially connected in this order from the positive electrode side to the negative electrode side. An emitter terminal of the first switching device S1 is connected to the negative electrode terminal of the input side smoothing capacitor 11 and the input side negative electrode terminal 1b. A collector terminal of the fourth switching device S4 is connected to the positive electrode terminal of the output side smoothing capacitor 108 and the output side positive electrode terminal 1c. A connection point of a collector terminal of the second switching device S2 and an emitter terminal of the third switching device S3 is connected to the positive electrode terminal of the input side smoothing capacitor 11 and the input side positive electrode terminal 1a via the reactor 12. A first terminal of the charge and discharge capacitor 101a is connected to a connection point of a collector terminal of the first switching device S1 and an emitter terminal of the second switching device S2; a second terminal is connected to a connection point of a collector terminal of the third switching device S3 and an emitter terminal of the fourth switching device S4.

A first voltage sensor 103 detects a voltage between terminals of the output side smoothing capacitor 108 (the output voltage V2 as the high side voltage). A second voltage sensor 104 detects a voltage of the charge and discharge capacitor 101a (a charge and discharge capacitor voltage V0). A current sensor 105 detects a reactor current IL which flows through the reactor 12.

2. The Configuration of the Controller 109

The controller 109 generates the gate signals G1 to G4 which perform an on/off control (switching operation) of each of the four switching devices S1 to S4 by PWM (Pulse Width Modulation) control, and controls an ON duty ratio and a phase of an ON period of each of the four switching devices S1 to S4. The ON duty ratio is a ratio of the ON period to a switching period Tsw (=ON period/switching period Tsw).

The controller 109 is provided with processing circuits which perform the on/off control of each switching device S1 to S4. The processing circuits of the controller 109 may be configured by analog electronic circuits, such as a comparator, an operational amplifier, and a differential amplifying circuit; may be configured by digital electronic circuits, such as a computing processing unit 90, a storage apparatus 91 and input/output circuits 92, 93; and may be configured by both of analog electronic circuits and digital electronic circuits.

Figure 20:
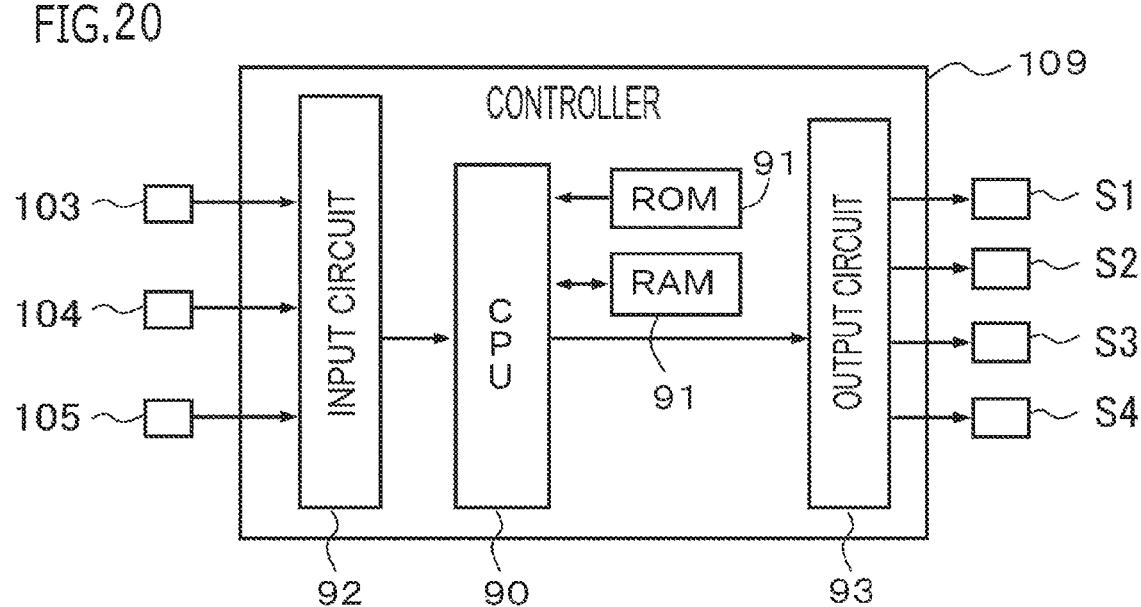
FIG. 20 is a block diagram of a controller according to Embodiment 1 of the present invention.

As shown in FIG. 20, the controller 109 may be provided with CPU (Central Processing Unit), DSP (Digital Signal Processor), ASIC (Application Specific Integrated Circuit), FPGA (Field Programmable Gate Array), various kinds of logical circuits, various kinds of signal processing circuits and the like, as the computing processing unit 90. As the computing processing unit 90, a plurality of the same type ones or the different type ones may be provided, and each processing may be shared and executed. As the storage apparatus 91, RAM (Random Access Memory), ROM (Read Only Memory) and the like are used. The input/output circuits are provided with an input circuit 92, such as an A/D converter, which inputs output signals of various kinds of sensors or switches such as current sensor and voltage sensor, into the computing processing unit 90, and an output circuit 93, such as a driving circuit, which outputs control signals to the electric loads, such as switching devices, from the computing processing unit 90. The computing processing unit 90, such as CPU, performs each processing by running software items (programs) stored in the storage apparatus 91 such as ROM, and collaborating with other hardware devices in the controller 109, such as the storage apparatus 91, the input/output circuits 92, 93.

The controller 109 controls a voltage V0 of the charge and discharge capacitor by performing a Δduty control and a phase shift control. The Δduty control is a control which performs one or both (in this example, both) of a first ON duty ratio difference change which changes an ON duty ratio difference between an ON duty ratio DT1 of the first switching device S1 and an ON duty ratio DT2 of the second switching devices S2, and a second ON duty ratio difference change which changes an ON duty ratio difference between an ON duty ratio DT3 of the third switching device S3 and an ON duty ratio DT4 of the fourth switching device S4. The phase shift control is a control which performs one or both (in this example, both) of a first phase difference change which changes a phase difference between a phase of an ON period of the first switching device S1 and a phase of an ON period of the second switching device S2, and a second phase difference change which changes a phase difference between a phase of an ON period of the third switching device S3 and a phase of the ON period of the fourth switching device S4.

In the present embodiment, in the Δduty control, the controller 109 changes the ON duty ratio difference so that a detection value of the charge and discharge capacitor voltage V0 approaches a charge and discharge capacitor voltage target value V0ref. In the phase shift control, the controller 109 changes the phase difference so that the detection value of the charge and discharge capacitor voltage V0 approaches the charge and discharge capacitor voltage target value V0ref.

The controller 109 controls the output voltage V2 by performing a basis duty control. The basis duty control is a control which performs both of a first ON duty ratio change and a second ON duty ratio change so that a detection value of the output voltage V2 approaches an output voltage target value V2ref. The first ON duty ratio change changes a basis ON duty ratio which is an average value between the ON duty ratio DT1 of the first switching device S1 and the ON duty ratio DT2 of the second switching device S2, in the state of the same ON duty ratio difference and the same phase difference. The second ON duty ratio change changes a basis ON duty ratio which is an average value between the ON duty ratio DT3 of the third switching device S3 and the ON duty ratio DT4 of the fourth switching device S4, in the state of the same ON duty ratio difference and the same phase difference.

FIG. 2 is a circuit diagram (a block diagram) showing a detailed configuration of the controller 109 according to the present embodiment. In the present embodiment, the controller 109 is provided with a first calculation unit 24, a second calculation unit 25, a third calculation unit 26, and a switching control unit 30, in order to perform the basis duty control, the Δduty control, and the phase shift control.

<First Calculation Unit 24>

The first calculation unit 24 calculates a first calculation value Duty which changes the basis ON duty ratio. In the present embodiment, the first calculation unit 24 calculates the first calculation value Duty based on a difference voltage V2err (hereinafter, referred to an output difference voltage V2err) between the output voltage target value V2ref as a command value of the high side voltage, and the detection value of the output voltage V2 as the high side voltage.

In the present embodiment, the first calculation unit 24 is provided with a subtractor 21 that calculates the output difference voltage V2err by subtracting the detection value of the output voltage V2 from the output voltage target value V2ref, and a first controller 24a that calculates the first calculation value Duty based on the output difference voltage V2err.

The first controller 24a calculates the first calculation value Duty by performing a feedback control, such as P control, PI control, and PID control, to the output difference voltage V2err. The first controller 24a calculates the first calculation value Duty within a range of 0 to 1. Accordingly, the first controller 24a changes the first calculation value Duty so that the detection value of the output voltage V2 approaches the output voltage target value V2ref.

<Second Calculation Unit 25>

The second calculation unit 25 calculates a second calculation value Δduty which changes the ON duty ratio difference in the Δduty control, based on a difference voltage V0err (hereinafter, referred to a charge and discharge capacitor difference voltage V0err) between a charge and discharge capacitor voltage target value V0ref as a voltage command value of the charge and discharge capacitor, and the charge and discharge capacitor voltage V0.

In the present embodiment, the second calculation unit 25 is provided with a subtractor 23 that calculates the charge and discharge capacitor difference voltage V0err by subtracting the charge and discharge capacitor voltage V0 from the charge and discharge capacitor voltage target value V0ref, and a second controller 25c that calculates the second calculation value Δduty based on the charge and discharge capacitor difference voltage V0err. The second controller 25c calculates the second calculation value Δduty by performing a feedback control, such as P control, PI control, and PID control, to the charge and discharge capacitor difference voltage V0err. Accordingly, the second controller 25c changes the second calculation value Δduty so that the charge and discharge capacitor voltage V0 approaches the charge and discharge capacitor voltage target value V0ref. The ON duty ratio difference becomes 0 in a basis ON duty ratio difference from which the second calculation value Δduty becomes 0.

The second calculation unit 25 is provided with a multiplier 22 that calculates the charge and discharge capacitor voltage target value V0ref based on the detection value of the output voltage V2. In the present embodiment, in order to minimize the ripple current of the reactor 12, the multiplier 22 sets a value obtained by multiplying 0.5 to the detection value of the output voltage V2, as the charge and discharge capacitor voltage target value V0ref.

In the present embodiment, the second calculation unit 25 changes the second calculation value Δduty in accordance with a reactor current IL detected by the current sensor 105. For that, the second calculation unit 25 is provided with a current limiting unit 25a and a difference voltage correction unit 25b. As described in detail later, the current limiting unit 25a calculates a value obtained by performing a limitation processing to the reactor current IL, as a reactor current IL* after limitation. Then, the difference voltage correction unit 25b outputs a value obtained by correcting the charge and discharge capacitor difference voltage V0err based on the reactor current IL* after limitation, as a difference voltage V0err* after current correction. Then, the second controller 25c calculates the second calculation value Δduty based on the difference voltage V0err* after current correction.

<Third Calculation Unit 26>

The third calculation unit 26 calculates a third calculation value θ which changes the phase difference in the phase shift control based on the charge and discharge capacitor difference voltage V0err between the charge and discharge capacitor voltage target value V0ref and the charge and discharge capacitor voltage V0.

In the present embodiment, the third calculation unit 26 is provided with a third controller 26a that calculates the third calculation value θ based on the charge and discharge capacitor difference voltage V0err. The third controller 26a calculates the third calculation value θ by performing a feedback control, such as P control, PI control, and PID control, to the charge and discharge capacitor difference voltage V0err. Accordingly, the third controller 26a changes the third calculation value θ so that the charge and discharge capacitor voltage V0 approaches the charge and discharge capacitor voltage target value V0ref. The phase difference becomes 180 degrees in a basis phase difference from which the third calculation value θ becomes 0.

Figure 7:
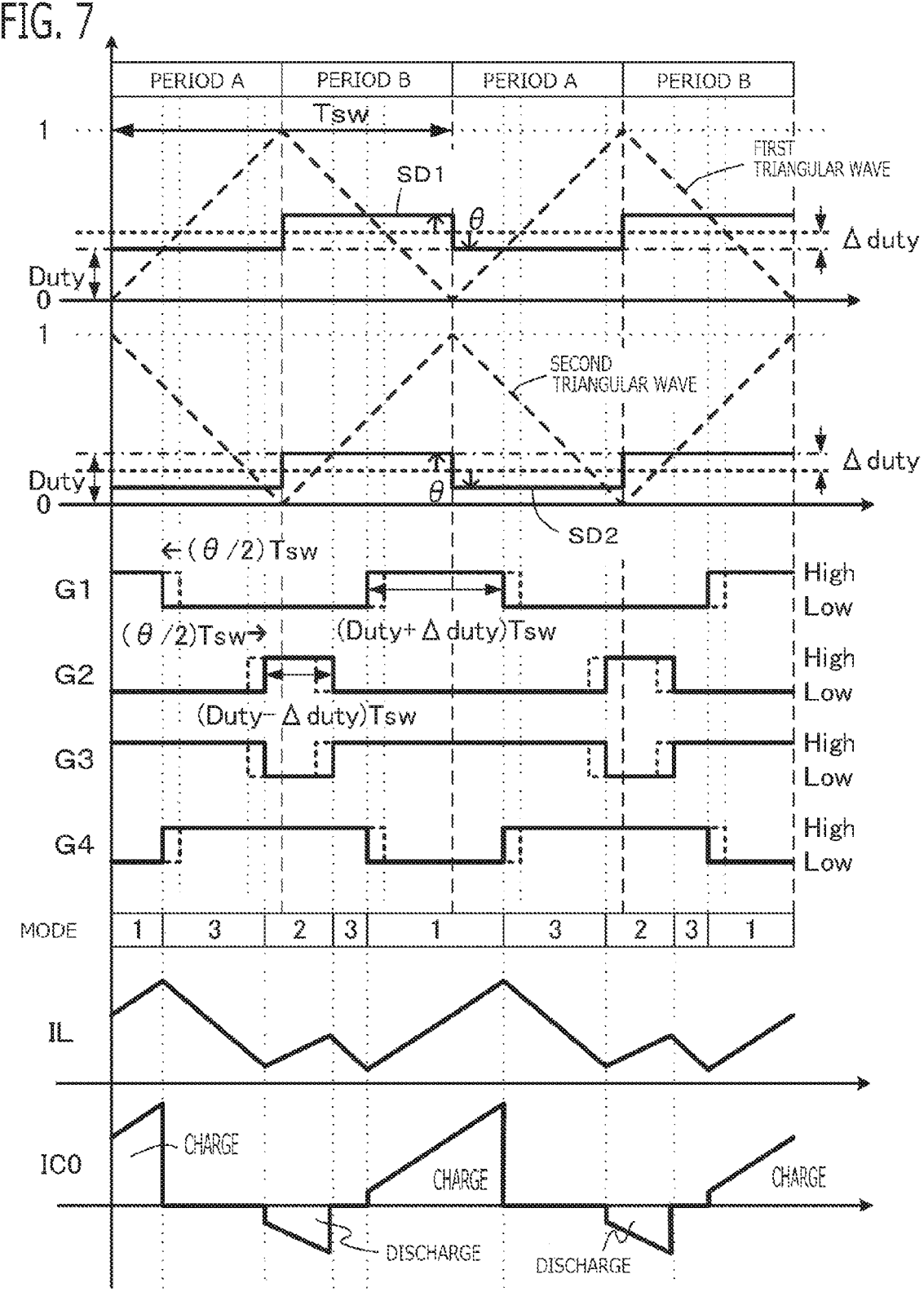
FIG. 7 is an explanation drawing of a DC/DC converter in the case where a step-up ratio is less than twice according to Embodiment 1 of the present invention.

In the present embodiment, the third calculation unit 26 calculates a value obtained by performing processing which reverses a positive or negative sign alternately at half period of a switching period Tsw described below to the third calculation value θ, as the final third calculation value ±θ. For that, the third calculation unit 26 is provided with a rectangular wave generator 26c that generates a rectangular wave which oscillates between +1 and −1 at the switching period Tsw, and a rectangular wave multiplier 26b that calculates the final third calculation value ±θ by multiplying the rectangular wave of ±1 to the third calculation value θ. As shown in FIG. 7 and the like, the rectangular wave generator 26c generates the rectangular wave which oscillates synchronizing with a first triangular wave and a second triangular wave. Specifically, the rectangular wave generator 26c outputs+1 during a half period when the first triangular wave is decreasing and the second triangular wave is increasing, and outputs −1 during a half period when the first triangular wave is increasing and the second triangular wave is decreasing.

As shown in FIG. 7 and the like, since the first triangular wave is decreasing during the third calculation value θ is a value of plus and the third calculation value becomes +θ, the first gate signal G1 shifts to the phase delay side; since the first triangular wave is increasing during the third calculation value is −θ, the first gate signal G1 shifts to the phase delay side. Accordingly, in the case where the third calculation value θ is a value of plus, the first gate signal G1 shifts to the phase delay side by a time proportional to a magnitude of the third calculation value θ. On the other hand, since the second triangular wave is increasing during the third calculation value θ is a value of plus and third calculation value becomes +θ, the second gate signal G2 shifts to the phase advance side; since the second triangular wave is decreasing during the third calculation value becomes −θ, the second gate signal G2 shifts to the phase advance side. Accordingly, in the case where the third calculation value θ is a value of plus, the second gate signal G2 shifts to the phase advance side by a time proportional to a magnitude of the third calculation value θ. Therefore, in proportion to the third calculation value θ, the phase of the ON period of the first switching device S1 shifts in the delay direction, and the phase of the ON period of the second switching device S2 shifts in the advance direction. In the same manner, in proportion to the third calculation value θ, the phase of the ON period of the fourth switching device S4 shifts in the delay direction, and the phase of the ON period of the third switching device S3 shifts in the advance direction. In the case where the third calculation value θ is a value of minus, the advance direction and the delay direction are reversed.

<Switching Control Unit 30>

The switching control unit 30 controls the ON duty ratio and the phase of the ON period of each of the switching devices S1 to S4 based on the first calculation value Duty, the second calculation value Δduty, and the third calculation value ±θ.

In the present embodiment, the switching control unit 30 calculates a first control value SD1 which added the second calculation value Δduty and the third calculation value ±θ to the first calculation value Duty, and calculates a second control value SD2 which subtracted the second calculation value Δduty from the first calculation value Duty and added the third calculation value ±θ to the first calculation value Duty. The first control value SD1 before addition of the third calculation value ±θ is proportional to the ON duty ratio of the first switching device S1 and the OFF duty ratio of the fourth switching device S4; the second control value SD2 before addition of the third calculation value ±θ is proportional to the ON duty ratio of the second switching device S2 and the OFF duty ratio of the third switching device S3.

The switching control unit 30 is provided with a Duty correction block 28 and a phase shift correction block 29. The Duty correction block 28 is provided with an adder 28a that adds the second calculation value Δduty to the first calculation value Duty for calculation of the first control value SD1, and a subtractor 28b that subtracts the second calculation value Δduty from the first calculation value Duty for calculation of the second control value SD2. The phase shift correction block 29 is provided with an adder 29a that calculates the first control value SD1 by adding the third calculation value ±θ to an output of the adder 28a, and an adder 29b that calculates the second control value SD2 by adding the third calculation value ±θ to an output of the subtractor 28b.

The switching control unit 30 calculates the first triangular wave which oscillates between a minimum value (in this example, 0) and a maximum values (in this example, 1) at the switching period Tsw, and the second triangular wave whose a phase is inverted 180 degrees to the first triangular wave. Since the phase of the first triangular wave and the phase of the second triangular wave are inverted 180 degrees, the ripple current of the reactor 12 can be minimized. The phase of the ON period of each switching device can be shifted to the opposite direction by the simple processing which multiplies the rectangular wave which oscillates ±1 to the third calculation value θ.

Then, the switching control unit 30 controls a switching operation of one or both (in this example, both) of the first switching device S1 and the fourth switching device S4 based on the comparison result between the first control value SD1 and the first triangular wave, and controls a switching operation of one or both (in this example, both) of the second switching device S2 and the third switching device S3 based on the comparison result between the second control value SD2 and the second triangular wave.

For that, the switching control unit 30 is provided with a first triangular wave generator 30e that generates the first triangular wave, and a second triangular wave generator 30f that generates the second triangular wave. The switching control unit 30 is provided with a first comparator 30a that compares the first control value SD1 with the first triangular wave to generate the first gate signal G1, and a second comparator 30c that compares the second control value SD2 with the second triangular wave to generate the second gate signal G2. The first comparator 30a sets the first gate signal G1 to Low in the case where the first triangular wave is larger than the first control value SD1, and sets the first gate signal G1 to High in the case where the first triangular wave is less than the first control value SD1. Similarly, the second comparator 30c sets the second gate signal G2 to Low in the case where the second triangular wave is larger than the second control value SD2, and sets the second gate signal G2 to High in the case where the second triangular wave is less than the second control value SD2.

The switching control unit 30 is provided with a first inverting circuit 30b that generates the fourth gate signal G4 which inverted High and Low of the first gate signal G1, and a second inverting circuit 30d that generates the third gate signal G3 which inverted High and Low of the second gate signal G2. The first gate signal G1 performs the switching operation of the first switching device S1; the second gate signal G2 performs the switching operation of the second switching device S2; the third gate signal G3 performs the switching operation of the third switching device S3; and the fourth gate signal G4 performs the switching operation of the fourth switching device S4.

<Limiter 27>

The controller 109 is provided with a limiter 27 that performs a lower limitation of the first control value SD1 by the minimum value (in this example, 0) and performs an upper limitation of the first control value SD1 by the maximum value (in this example, 1), and performs a lower limitation of the second control value SD2 by the minimum value and performs an upper limitation of the second control value SD2 by the maximum value. In the present embodiment, as described in detail later, the limiter 27 applies a limitation to the third calculation value θ which the third controller 26a calculated. Here, θ* shows the third calculation value before limitation by the limiter 27, and θ shows the third calculation value after limitation.

<Explanation of Operation of DC/DC Converter 1>

Next, an operation of the DC/DC converter 1 in a steady state will be explained. The steady state means a state when the on/off control of the switching devices S1 to S4 is performed and the output voltage V2 is stable. As operating states of the DC/DC converter 1, there are two states of a state (a power running operation, a step-up operation) of driving the electric motor 3 by stepping up voltage and supplying electric power from the battery 2 to the electric motor 3, and a state (a regenerative operation, a step-down operation) of stepping down electric power which the electric motor 3 generated and supplying to the battery 2.

Figure 3:
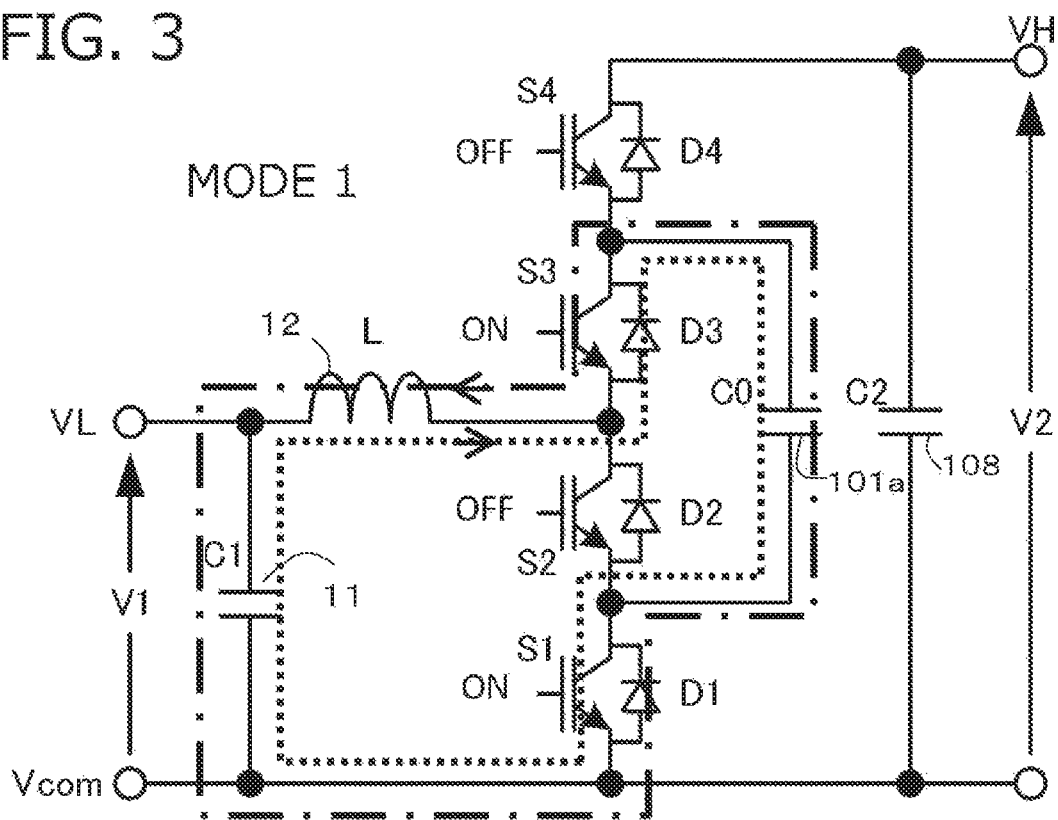
FIG. 3 is an explanation drawing showing an operation mode 1 of a DC/DC converter according to Embodiment 1 of the present invention.

As shown in FIG. 3 to FIG. 6, as operation modes which are switching patterns of the first to fourth switching devices S1 to S4, there are four modes of a mode 1 to a mode 4. In the mode 1, as shown in FIG. 3, the first switching device S1 and the third switching device S3 are set to ON, and the second switching device S2 and the fourth switching device S4 are set to OFF. At the time of the step-up operation (the power running operation), as a current route is shown in FIG. 3 by a dotted line, current flows through the first switching device S1 and the third diode D3, and energy is stored in the charge and discharge capacitor 101a. At the time of the step-down operation (the regenerative operation), as a current route is shown in FIG. 3 by a dashed dotted line, current flows through the first diode D1 and the third switching device S3, and the energy of the charge and discharge capacitor 101a is emitted.

Figure 4:
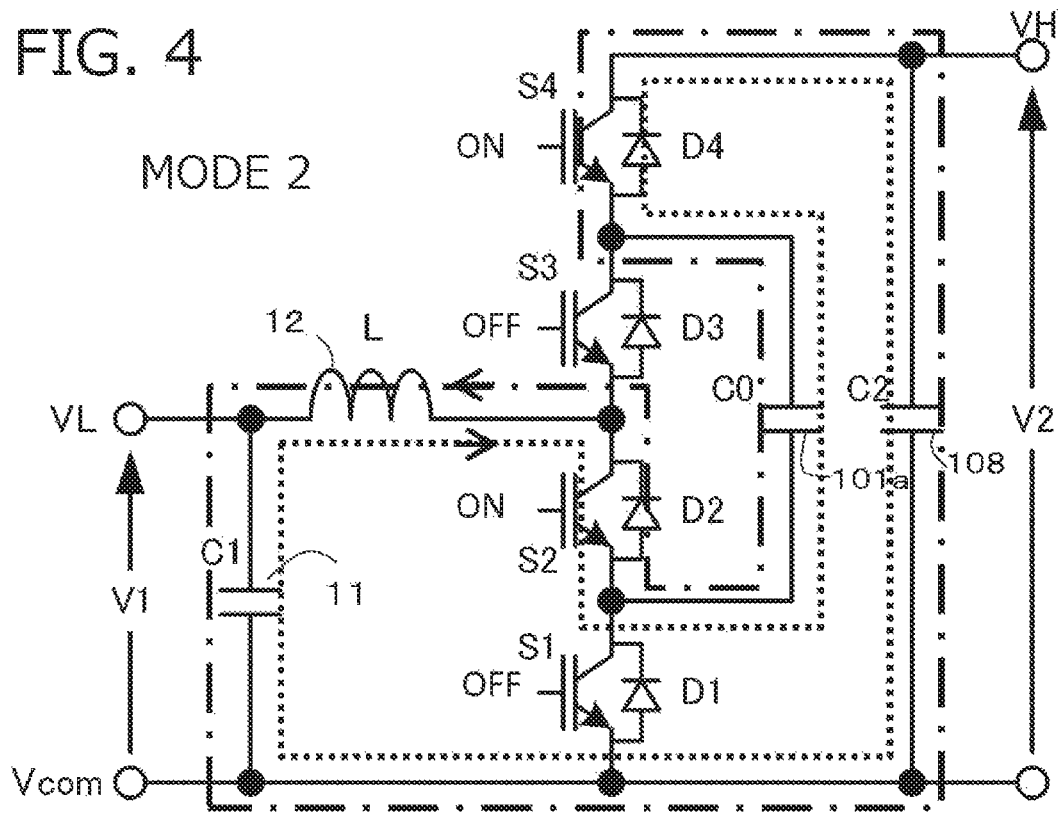
FIG. 4 is an explanation drawing showing an operation mode 2 of a DC/DC converter according to Embodiment 1 of the present invention.

In the mode 2, as shown in FIG. 4, the first switching device S1 and the third switching device S3 are set to OFF, and the second switching device S2 and the fourth switching device S4 are set to ON. At the time of the step-up operation (the power running operation), as a current route is shown in FIG. 4 by a dotted line, current flows through the second switching device S2 and the fourth diode D4, and the energy of the charge and discharge capacitor 101a is emitted. At the time of the step-down operation (the regenerative operation), as a current route is shown in FIG. 4 by a dashed dotted line, current flows through the second diode D2 and the fourth switching device S4, and energy is stored in the charge and discharge capacitor 101a.

In the mode 3, as shown in FIG. 5, the first switching device S1 and the second switching device S2 are set to OFF, and the third switching device S3 and the fourth switching device S4 are set to ON. At the time of the step-up operation (the power running operation), as a current route is shown in FIG. 5 by a dotted line, current flows through the third diode D3 and the fourth diode D4, and the energy of the reactor 12 is emitted. At the time of the step-down operation (the regenerative operation), as a current route is shown in FIG. 5 by a dashed dotted line, current flows through the third switching device S3 and the fourth switching device S4, and energy is stored in the reactor 12.

In the mode 4, as shown in FIG. 6, the first switching device S1 and the second switching device S2 are set to ON, and the third switching device S3 and the fourth switching device S4 are set to OFF. At the time of the step-up operation (the power running operation), as a current route is shown in FIG. 6 by a dotted line, current flows through the first switching device S1 and the second switching device S2, and energy is stored in the reactor 12. At the time of the step-down operation (the regenerative operation), as a current route is shown in FIG. 6 by a dashed dotted line, current flows through the first diode D1 and the second diode D2, and the energy of the reactor 12 is emitted.

By adjusting time ratio of these operation modes suitably, the input voltage V1, which is inputted to between the input side positive electrode terminal 1a and the input side negative electrode terminal 1b, can be stepped up to the output voltage V2 to output to between the output side positive electrode terminal 1c and the output side negative electrode terminal 1d, and the output voltage V2, which is inputted to between the output side positive electrode terminal 1c and the output side negative electrode terminal 1d, can be stepped down to the input voltage V1 to output to between the input side positive electrode terminal 1a and the input side negative electrode terminal 1b.

In the mode 1 to the mode 4, at the time of the step-up operation, since current flows through the first switching device S1 and the second switching device S2 which were set to ON, the first and the second semiconductor circuits exhibit the function of the switching device; and since current flows through the third diode D3 and the fourth diode D4, the third and the fourth semiconductor circuits exhibit the function of the diode element. At the time of the step-down operation, since current flows through the first diode D1 and the second diode D2, the first and the second semiconductor circuits exhibit the function of the diode element; and since current flows through the third switching device S3 and the fourth switching device S4 which were set to ON, the third and the fourth semiconductor circuits exhibit the function of the switching device.

The DC/DC converter 1 differs in operation of the steady state between the case where a step-up ratio N and a step-down ratio N of the output voltage V2 to the input voltage V1 are less than twice, and the case where the step-up ratio N and the step-down ratio N are greater than or equal to twice. Here, the step-up ratio N and the step-down ratio N=the output voltage V2/the input voltage V1.

<In the Case where the Step-Up Ratio is Less than Twice>

First, the step-up operation (the power running operation) in the case where the step-up ratio N(=V2/V1) is less than twice will be explained. FIG. 7 shows the first triangular wave and the second triangular wave, the first control value SD1 and the second control value SD2, the gate signals G1 to G4 of each switching device S1 to S4, the operation modes, the reactor current IL, the current IC0 of the charge and discharge capacitor 101a (hereinafter, referred to as a charge and discharge capacitor current IC0), in the case where the step-up ratio N is less than twice.

In the example shown in FIG. 7, limitation is not performed by the limiter 27, so it becomes θ=θ*; the charge and discharge capacitor voltage V0 is controlled so as to become a 0.5 times value of the output voltage V2 in the steady state; a size relation between the input voltage V1, the output voltage V2, and the charge and discharge capacitor voltage V0 is as follows.

$$V2 > V1 > V0$$

In the state (the mode 1 (dotted line in FIG. 3)) where the gate signals G1, G3 of the first and the third switching device S1, S3 are High, and the gate signals G2, G4 of the second and the fourth switching device S2, S4 are Low, according to the following route, energy shifts to the reactor 12 and the charge and discharge capacitor 101a from the input side smoothing capacitor 11.

The input side smoothing capacitor 11→the reactor 12→the third diode D3→the charge and discharge capacitor 101a→the first switching device S1

Next, in the state (the mode 3 (dotted line in FIG. 5)) where the gate signals G1, G2 of the first and the second switching devices S1, S2 are Low, and the gate signals G3, G4 of the third and the fourth switching devices S3, S4 are High, according to the following route, energy stored in the reactor 12 shifts to the input side smoothing capacitor 11 and the output side smoothing capacitor 108.

The input side smoothing capacitor 11→the reactor 12→the third diode D3→the fourth diode D4→the output side smoothing capacitor 108

Next, in the state (the mode 2 (dotted line in FIG. 4)) where the gate signals G1, G3 of the first and the third switching devices S1, S3 are Low, and the gate signals G2, G4 of the second and the fourth switching devices S2, S4 are High, according to the following route, energy stored in the charge and discharge capacitor 101a shifts to the input side smoothing capacitor 11 and the output side smoothing capacitor 108, and energy is stored in the reactor 12.

The input side smoothing capacitor 11→the reactor 12→the second switching device S2→the charge and discharge capacitor 101a→the fourth diode D4→the output side smoothing capacitor 108

Next, in the state (the mode 3 (dotted line in FIG. 5)) where the gate signals of the first and the second switching devices S1, S2 are Low, and the gate signals of the third and the fourth switching devices S3, S4 are High, according to the following route, energy stored in the reactor 12 shifts to the input side smoothing capacitor 11 and the output side smoothing capacitor 108.

The input side smoothing capacitor 11→the reactor 12→the third diode D3→the fourth diode D4→the output side smoothing capacitor 108

By repetition of operation of a sequence of "the mode 1—the mode 3—the mode 2—the mode 3", the input voltage V1 inputted to between the input side positive electrode terminal 1a and the input side negative electrode terminal 1b is stepped up to any voltage between 1 time and twice to output to between the output side positive electrode terminal 1c and the output side negative electrode terminal 1d as the output voltage V2; accordingly, energy of the battery 2 is supplied to the electric motor 3.

<In the Case where the Step-Up Ratio is Greater than or Equal to Twice>

Figure 8:
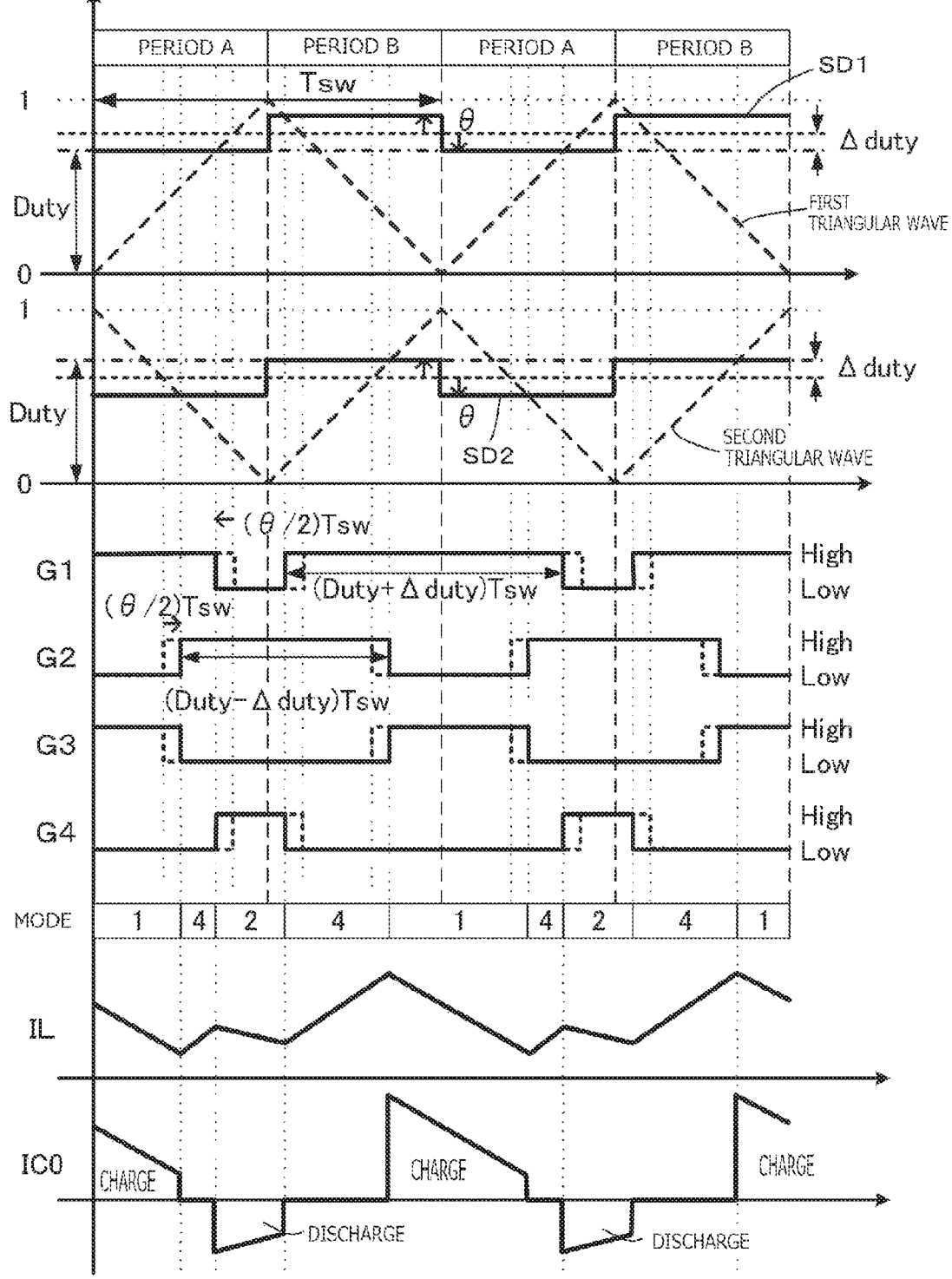
FIG. 8 is an explanation drawing of a DC/DC converter in the case where a step-up ratio is greater than or equal to twice according to Embodiment 1 of the present invention.

Next, the step-up operation (the power running operation) in the case where the step-up ratio N(=V2/V1) is greater than or equal to twice will be explained. FIG. 8 shows the first triangular wave and the second triangular wave, the first control value SD1, the second control value SD2, the gate signals G1 to G4 of each switching device S1 to S4, the operation modes, the reactor current IL, the charge and discharge capacitor current IC0, in the case where the step-up ratio N is greater than or equal to twice.

The charge and discharge capacitor voltage V0 is controlled so as to become a 0.5 times value of the output voltage V2 in the steady state; a size relation between the input voltage V1, the output voltage V2, and the charge and discharge capacitor voltage V0 is as follows.

$$V2 > V0 > V1$$

In the state (the mode 1 (dotted line in FIG. 3)) where the gate signals G1, G3 of the first and the third switching device S1, S3 are High, and the gate signals G2, G4 of the second and the fourth switching device S2, S4 are Low, according to the following route, energy stored in the reactor 12 shifts to the input side smoothing capacitor 11 and the charge and discharge capacitor 101a.

The input side smoothing capacitor 11→the reactor 12→the third diode D3→the charge and discharge capacitor 101a→the first switching device S1

Next, in the state (the mode 4 (dotted line in FIG. 6)) where the gate signals G1, G2 of the first and the second switching devices S1, S2 are High, and the gate signal G3, G4 of the third and fourth switching devices S3, S4 are Low, according to the following route, energy shifts to the reactor 12 from the input side smoothing capacitor 11.

The input side smoothing capacitor 11→the reactor 12→the second switching device S2→the first switching device S1

Next, in the state (the mode 2 (dotted line in FIG. 4)) where the gate signals G1, G3 of the first and the third switching device S1, S3 are Low, and the gate signals G2, G4 of the second and the fourth switching device S2 and S4 are High, according to the following route, energy stored in the reactor 12 and the charge and discharge capacitor 101a shifts to the input side smoothing capacitor 11 and the output side smoothing capacitor 108.

The input side smoothing capacitor 11→the reactor 12→the second switching device S2→the charge and discharge capacitor 101a→the fourth diode D4→the output side smoothing capacitor 108

Next, in the state (the mode 4 (dotted line in FIG. 6)) where the gate signals G1, G2 of the first and the second switching devices S1, S2 are High, and the gate signals G3, G4 of the third and the fourth switching devices S3, S4 are Low, according to the following route, energy shifts to the reactor 12 from the input side smoothing capacitor 11.

The input side smoothing capacitor 11→the reactor 12→the second switching device S2→the first switching device S1

By repetition of operation of a sequence of "the mode 1—the mode 4—the mode 2—the mode 4", the input voltage V1 inputted to between the input side positive electrode terminal 1a and the input side negative electrode terminal 1b is stepped up to any voltage, which is greater than or equal to twice, to output to between the output side positive electrode terminal 1c and the output side negative electrode terminal 1d as the output voltage V2; accordingly, energy of the battery 2 is supplied to the electric motor 3.

<In the Case where the Step-Down Ratio is Less than Twice>

Next, the step-down operation (the regenerative operation) in the case where the step-down ratio N(=V2/V1) is less than twice will be explained. FIG. 9 shows the first triangular wave and the second triangular wave, the first control value SD1, the second control value SD2, the gate signals G1 to G4 of each switching device S1 to S4, the operation modes, the reactor current IL, the charge and discharge capacitor current IC0, in the case where the step-down ratio N is less than twice.

The charge and discharge capacitor voltage V0 is controlled so as to become a 0.5 times value of the output voltage V2 in the steady state; a size relation between the input voltage V1, the output voltage V2, and the charge and discharge capacitor voltage V0 is as follows.

$$V2>V1>V0$$

In the state (the mode 1 (dashed dotted line in FIG. 3)) where the gate signals G1, G3 of the first and the third switching devices S1, S3 are High, and the gate signals G2, G4 of the second and the fourth switching devices S2, S4 are Low, according to the following route, energy shifts to the smoothing capacitor 11 from the charge and discharge capacitor 101a and the reactor 12.

The input side smoothing capacitor 11←the reactor 12←the third switching device S3←the charge and discharge capacitor 101a←the first diode D1

Next, in the state (the mode 3 (dashed dotted line in FIG. 5)) where the gate signals G1, G2 of the first and the second switching devices S1, S2 are Low, and the gate signal G3, G4 of the third and the fourth switching devices S3, S4 are High, according to the following route, energy shifts to the reactor 12 and the input side smoothing capacitor 11 from the output side smoothing capacitor 108.

The input side smoothing capacitor 11←the reactor 12←the third switching device S3←the fourth switching device S4←the output side smoothing capacitor 108

Next, in the state (the mode 2 (dashed dotted line in FIG. 4)) where the gate signals G1, G3 of the first and the third switching devices S1, S3 are Low, and the gate signals G2, G4 of the second and the fourth switching devices S2, S4 are High, according to the following route, energy shifts to the charge and discharge capacitor 101a and the input side smoothing capacitor 11 from the output side smoothing capacitor 108 and the reactor 12.

The input side smoothing capacitor 11←the reactor 12←the second diode D2←the charge and discharge capacitor 101a←the fourth switching device S4←the output side smoothing capacitor 108

Next, in the state (the mode 3 (dashed dotted line in FIG. 5)) where the gate signals G1, G2 of the first and the second switching devices S1, S2 are Low, and the gate signal G3, G4 of the third and the fourth switching devices S3, S4 are High, according to the following route, energy shifts to the reactor 12 and the input side smoothing capacitor 11 from the output side smoothing capacitor 108.

The input side smoothing capacitor 11←the reactor 12←the third switching device S3←the fourth switching device S4←the output side smoothing capacitor 108

By repetition of operation of a sequence of "the mode 1—the mode 3—the mode 2—the mode 3", the output voltage V2 between the output side positive electrode terminal 1c and the output side negative electrode terminal 1d is stepped down by any step-down ratio N(=V2/V1) between 1 time and twice to output as the input voltage V1 between the input side positive electrode terminal 1a and the input side negative electrode terminal 1b; accordingly, generated energy of the electric motor 3 is stored in the battery 2.

<In the Case where the Step-Down Ratio is Greater than or Equal to Twice>

Next, the step-down operation (the regenerative operation) in the case where the step-down ratio N(=V2/V1) is greater than or equal to twice will be explained. FIG. 10 shows the first triangular wave and the second triangular wave, the first control value SD1, the second control value SD2, the gate signals G1 to G4 of each switching device S1 to S4, the operation modes, the reactor current IL, the charge and discharge capacitor current IC0, in the case where the step-down ratio N is greater than or equal to twice.

The charge and discharge capacitor voltage V0 is controlled so as to become a 0.5 times value of the output voltage V2 in the steady state; a size relation between the input voltage V1, the output voltage V2, and the charge and discharge capacitor voltage V0 is as follows.

$$V2>V0>V1$$

In the state (the mode 1 (dashed dotted line in FIG. 3)) where the gate signals G1, G3 of the first and the third switching devices S1, S3 are High, and the gate signals G2, G4 of the second and the fourth switching device S2, S4 are Low, according to the following route, energy shifts to the reactor 12 and the input side smoothing capacitor 11 from the charge and discharge capacitor 101a.

The input side smoothing capacitor 11←the reactor 12←the third switching device S3←the charge and discharge capacitor 101a←the first diode D1

Next, in the state (the mode 4 (dashed dotted line in FIG. 6)) where the gate signals G1, G2 of the first and the second switching devices S1, S2 are High, and the gate signals of the third and fourth switching devices S3, S4 are Low, according to the following route, energy shifts to the input side smoothing capacitor 11 from the reactor 12.

The input side smoothing capacitor 11←the reactor 12←the second diode D2←the first diode D1

Next, in the state (the mode 2 (dashed dotted line in FIG. 4)) where the gate signals G1, G3 of the first and the third switching devices S1, S3 are Low, and the gate signals of the second and the fourth switching devices S2, S4 are High, according to the following route, energy shifts to the reactor 12, the charge and discharge capacitor 101a, and the input side smoothing capacitor 11 from the output side smoothing capacitor 108.

The input side smoothing capacitor 11←the reactor 12←the second diode D2←the charge and discharge capacitor 101a←the fourth switching device S4←the output side smoothing capacitor 108

Next, in the state (the mode 4 (dashed dotted line in FIG. 6)) where the gate signals G1, G2 of the first and the second switching devices S1, S2 are High, and the gate signals G3, G4 of the third and the fourth switching devices S3, S4 and G4 are Low, according to the following route, energy shifts to the input side smoothing capacitor 11 from the reactor 12.

The input side smoothing capacitor 11←the reactor 12←the second diode D2←the first diode D1

By repetition of operation of a sequence of "the mode 1—the mode 4—the mode 2—the mode 4", the output voltage V2 between the output side positive electrode terminal 1c and the output side negative electrode terminal 1d is stepped down by any step-down ratio N(=V2/V1), which is greater than or equal to one, to output as the input voltage V1 between the input side positive electrode terminal 1a and the input side negative electrode terminal 1b; accordingly, generated energy of the electric motor 3 is stored in the battery 2.

<A State Equation of the DC/DC Converter 1>

Supposing that the third calculation value θ is 0, in the present embodiment, the first ON duty ratio DT1 of the first switching device S1 becomes equal to the first control value SD1, the second ON duty ratio DT2 of the second switching device S2 becomes equal to the second control value SD2, the fourth ON duty ratio DT4 of the fourth switching device S4 becomes equal to a value obtained by subtracting the first control value SD1 from one (=1−SD1), and the third ON duty ratio DT3 of the third switching device S3 becomes equal to a value obtained by subtracting the second control value SD2 from one (=1−SD2). When a capacity of the output side smoothing capacitor 108 is set to C2, a capacity of the charge and discharge capacitor 101a is set to C0, an inductance value of the reactor 12 is set to L, a current which flows through the reactor 12 is set to IL, and the output current is set to Io, a state average equation of the DC/DC converter 1 can be expressed by an equation (1).

$$\frac{d}{dt}\begin{bmatrix} V2 \\ V0 \\ IL \end{bmatrix} = \begin{bmatrix} 0 & 0 & \frac{1-DT1}{C2} \\ 0 & 0 & \frac{DT1-DT2}{C0} \\ -\frac{1-DT1}{L} & -\frac{DT1-DT2}{L} & 0 \end{bmatrix} \begin{bmatrix} V2 \\ V0 \\ IL \end{bmatrix} + \begin{bmatrix} -\frac{1}{C2} \\ 0 \\ 0 \\ 0 \end{bmatrix} Io + \begin{bmatrix} 0 \\ 0 \\ \frac{1}{L} \end{bmatrix} V1 \quad (1)$$

In a steady state, supposing that the left-hand side of the equation (1) is 0 and it is V0=0.5×V2, an equation (2) to an equation (4) are obtained. In a steady state, by making equal the first control value SD1 and the second control value SD2, it is understood that the output voltage V2 and the charge and discharge capacitor voltage V0 are ideally converged to a constant value.

$$V2/V1=1/(1-DT1) \quad (2)$$

$$IL=Io/(1-DT1) \quad (3)$$

$$DT1=DT2 \quad (4)$$

In the present embodiment, as mentioned above, the controller 109 is provided with the first calculation unit 24, and the first calculation unit 24 calculates the first calculation value Duty based on the output difference voltage V2err between the output voltage target value V2ref and the detection value of the output voltage V2. Then, as mentioned above, based on the first calculation value Duty, the switching control unit 30 calculates the first control value SD1 and the second control value SD2, and changes the first ON duty ratio DT1 of the first switching device S1 and the second ON duty ratio DT2 of the second switching device S2. According to this configuration, the first and the second ON duty ratio DT1, DT2 can be changed so that the output voltage V2 approaches the output voltage target value V2ref.

<First Problem>

However, in the actual DC/DC converter, there is a deviation from an ideal state, such as a loss owing to circuit resistance components, and an ON period error owing to variation in the signal delay of the gate signals. In particular, an influence on the charge and discharge capacitor voltage V0 resulting from a difference between the first ON period of the first switching device S1 and the second ON period of the second switching device S2 at the time of the step-up operation, or a difference of the third ON period of the third switching device S3 and the fourth ON period of the fourth switching device S4 at the time of the step-down operation, is big. In the case where the first ON period is larger than the second ON period and the reactor current IL is positive (the power running operation), from the equation (1), the charge and discharge capacitor voltage V0 increases gradually and finally becomes the same value as the output voltage V2. On the contrary, in the case where the first ON period is smaller than the second ON period and the reactor current IL is positive (the power running operation), from the equation (1), the charge and discharge capacitor voltage V0 decreases gradually and finally becomes zero voltage.

If the charge and discharge capacitor voltage V0 drops and becomes zero voltage; when the first switching device S1 is ON state and the fourth switching device S4 is OFF state, the output voltage V2 is applied only to the fourth switching device S4; when the first switching device S1 is OFF state and the fourth switching device S4 is ON state, the output voltage V2 is applied only to the first switching device S1. On the contrary, if the charge and discharge capacitor voltage V0 increases and becomes the output voltage V2, the output voltage V2 is applied to either of the second switching device S2 and the third switching device S3. In order to prevent overvoltage destruction of the switching devices, since it is necessary to set an element breakdown voltage of the switching devices to greater than or equal to the output voltage V2, it had become factors of excessive cost increase and efficiency deterioration.

To this problem, a first control method which controls the charge and discharge capacitor voltage V0 will be explained. As seen from the equation (1), in the case where the reactor current IL is positive; if the second ON duty ratio DT2 is made larger than the first ON duty ratio DT1, the charge and discharge capacitor voltage V0 can be increased; if the second ON duty ratio DT2 is made smaller than the first ON duty ratio DT1, the charge and discharge capacitor voltage V0 can be decreased. On the other hand, In the case where the reactor current IL is negative; if the second ON duty ratio DT2 is made larger than the first ON duty ratio DT1, the charge and discharge capacitor voltage V0 can be decreased; if the second ON duty ratio DT2 is made smaller than the first ON duty ratio DT1, the charge and discharge capacitor voltage V0 can be increased.

Accordingly, in the present embodiment, as mentioned above, the controller 109 controls the charge and discharge capacitor voltage V0 by performing the Δduty control. The Δduty control is the control which performs one or both (in this example, both) of the first ON duty ratio difference change which changes the ON duty ratio difference between the first ON duty ratio DT1 of the first switching device S1 and the second ON duty ratio DT2 of the second switching devices S2, and the second ON duty ratio difference change which changes the ON duty ratio difference between the third ON duty ratio DT3 of the third switching device S3 and the fourth ON duty ratio DT4 of the fourth switching device S4. In the Δduty control, the controller 109 changes the ON duty ratio difference so that the detection value of the charge and discharge capacitor voltage V0 approaches the charge and discharge capacitor voltage target value V0ref. The controller 109 is provided with the second calculation unit 25 that calculates the second calculation value Δduty which changes the ON duty ratio difference in the Δduty control.

According to this configuration, although there is a second problem to be described below, even if the variation mentioned above occurs, by changing the second calculation value Δduty and changing the ON duty ratio difference between the first ON duty ratio DT1 and the second ON duty ratio DT2, the charge and discharge capacitor voltage V0 can be brought close to the target voltage V0ref of the charge and discharge capacitor, and cost increase and efficiency deterioration can be suppressed.

<Second Problem>

Depending on whether it is the power running operation or the regenerative operation, it is necessary to reverse positive/negative of change direction of the ON duty ratio difference (the second calculation value Δduty) to the difference voltage V0err between the target voltage V0ref of the charge and discharge capacitor and the charge and discharge capacitor voltage V0. Accordingly, in the present embodiment, the controller 109 reverses positive/negative of change direction of the ON duty ratio difference (the second calculation value Δduty) in accordance with positive/negative of the reactor current IL detected by the current sensor 105.

However, in a low power state, a magnitude of the reactor current IL may become small and the reactor current IL may become within a detection error range of the current sensor 105. For this reason, there was the case where determination of positive/negative of the reactor current IL was mistaken, and change direction of the second calculation value Δduty was mistaken. As a result, there was the case where the charge and discharge capacitor voltage V0 deviated from the target voltage V0ref of the charge and discharge capacitor. In the case where the electric motor 3 is configured so as to continue the low power state, if the low power state is taken into consideration, it was necessary to set the element breakdown voltage of the switching device to greater than or equal to the output voltage V2, and factors of excessive cost increase and efficiency deterioration were not able to be avoided.

To this problem, a second control method which controls the charge and discharge capacitor voltage V0 will be explained. In order to minimize ripple of the reactor current IL, in an ideal state without variation, a phase of the first gate signal G1 of the first switching device S1 and a phase of the second gate signal G2 of the second switching device S2 are shifted mutually by 180 degrees. When further phase shift amount from this state where phases are shifted by 180 degrees ideally is set to $\theta$, the capacity of the charge and discharge capacitor 101a is set to C0, and the inductance value of the reactor 12 is set to L, state average equations of the charge and discharge capacitor voltage V0 of the DC/DC converter 1 can be expressed by an equation (5). As shown in the equation (5), the state equations differ between the case where the step-up ratio N is less than twice and the case where the step-up ratio N is greater than or equal to twice.

$$\frac{dV0}{dt} = \frac{\Theta \cdot Tsw}{L \cdot C0} \cdot \frac{(V2-V1)^2}{V2} \left(N = \frac{V2}{V1} < 2\right) \quad (5)$$

-continued $$\frac{dV0}{dt} = \frac{\Theta \cdot Tsw}{L \cdot C0} \cdot \frac{V1^2}{V2} \left(N = \frac{V2}{V1} \geq 2\right)$$

As seen from the equation (5), when the additional phase shift Θ is set to a positive value, the voltage of the charge and discharge capacitor voltage V0 will rise, and when the additional phase shift Θ is set to a negative value, the voltage of the charge and discharge capacitor voltage V0 will drop. Accordingly, by changing a relative phase between the ON period of the first switching device S1 and the ON period of the second switching device S2 in an increasing direction or a decreasing direction, the voltage of the charge and discharge capacitor voltage V0 can be changed in an increasing direction or a decreasing direction.

Accordingly, in the present embodiment, as mentioned above, the controller 109 controls the charge and discharge capacitor voltage V0 by performing the phase shift control. The phase shift control is the control which performs one or both (in this example, both) of the first phase difference change which changes the phase difference between the phase of the ON period of the first switching device S1 and the phase of the ON period of the second switching device S2, and the second phase difference change which changes the phase difference between the phase of the ON period of the third switching device S3 and the phase of the ON period of the fourth switching device S4. In the phase shift control, the controller 109 changes the phase difference so that the detection value of the charge and discharge capacitor voltage V0 approaches the charge and discharge capacitor voltage target value V0ref. The controller 109 is provided with a third calculation unit 26 that calculates the third calculation value θ which changes the phase difference in the phase shift control.

According to this configuration, it is not necessary to change the phase difference (the third calculation value θ) in accordance with positive/negative of the reactor current IL detected by the current sensor 105; even in the low power state where the magnitude of the reactor current IL is small and the reactor current IL becomes within the detection error range of the current sensor 105, the charge and discharge capacitor voltage V0 can accurately be controlled.

But since the method of generating the gate signals G1 to G4 by comparing the first triangular wave and the first control value SD1 and comparing the second triangular wave and the second control value SD2 is used, the third calculation value θ from which the first control value SD1 and the second control value SD2 become values other than 0 to 1 cannot be added or subtracted. In particular, in the case where the first calculation value Duty is around zero (low step-up, low step-down) or around one (high step-up, high step-down), since the first control value SD1 and the second control value SD2 approach the lower limit 0 and the upper limit 1 by small phase difference (the third calculation value θ), it is necessary to limit the phase difference (the third calculation value θ). In the present embodiment, in the case where the first calculation value Duty is around zero (low step-up, low step-down) or around one (high step-up, high step-down), as described below, the phase difference (the third calculation value θ) is limited. On the other hand, by limiting the phase difference (the third calculation value θ) in the case of low step-up, low step-down, high step-up, and high step-down, since the phase difference after limitation (third calculation value θ) is insufficient against the loss owing to the circuit resistance components, and the deviation amount of the charge and discharge capacitor voltage V0 from the charge and discharge capacitor voltage target value V0ref owing to the variation in signal delay of the gate signals, there is a problem that the charge and discharge capacitor voltage V0 hardly follow the charge and discharge capacitor voltage target value V0ref.

Accordingly, in the present embodiment, as described above, since not only the phase shift control by the third calculation value θ but also the Δduty control by the second calculation value Δduty can be performed, even in low step-up or high step-up, it is possible to make the charge and discharge capacitor voltage V0 follow the charge and discharge capacitor voltage target value V0ref.

As mentioned above, in the Δduty control by the second calculation value Δduty, since the phase shift control by the third calculation value θ can be performed in the low power state where the charge and discharge capacitor voltage V0 is hardly controlled with sufficient accuracy, it is possible to make the charge and discharge capacitor voltage V0 follow the charge and discharge capacitor voltage target value V0ref with sufficient accuracy.

<Detailed Operation of the Controller 109>

Hereinafter, detailed operation of the controller 109 will be explained. In the case where the output voltage V2 is larger than the output voltage target value V2ref, in order to reduce the output voltage V2, the first calculation unit 24 reduces the first calculation value Duty by the first controller 24a so that both ON duty ratios DT1, DT2 of the first and the second switching devices S1, S2 become small. On the contrary, in the case where the output voltage V2 is smaller than the output voltage target value V2ref, in order to raise the output voltage V2, the first calculation unit 24 increases the first calculation value Duty by the first controller 24a so that both ON duty ratios DT1, DT2 of the first and the second switching devices S1, S2 become large.

In the Δduty control, the controller 109 changes the positive or negative change direction of the ON duty ratio difference in accordance with a current direction of the reactor current IL detected by the current sensor 105. In the present embodiment, the second calculation unit 25 changes the positive or negative change direction of the second calculation value Δduty, which changes the ON duty ratio difference, in accordance with the current direction of reactor current IL. Specifically, in the case where the reactor current IL is positive and the charge and discharge capacitor voltage V0 is larger than the charge and discharge capacitor voltage target value V0ref, in order to reduce the charge and discharge capacitor voltage V0, the second calculation unit 25 decreases the second calculation value Δduty so that the first ON duty ratio DT1 of the first switching device S1 is decreased and the second ON duty ratio DT2 of the second switching device S2 is increased. In the case where the reactor current IL is positive and the charge and discharge capacitor voltage V0 is smaller than the charge and discharge capacitor voltage target value V0ref, in order to raise the charge and discharge capacitor voltage V0, the second calculation unit 25 increases the second calculation value Δduty so that the first ON duty ratio DT1 of the first switching device S1 is increased and the second ON duty ratio DT2 of the second switching device S2 is decreased.

On the other hand, in the case where the reactor current IL is negative and the charge and discharge capacitor voltage V0 is larger than the charge and discharge capacitor voltage target value V0ref, in order to reduce the charge and discharge capacitor voltage V0, the second calculation unit 25 increases the second calculation value Δduty so that the first ON duty ratio DT1 of the first switching device S1 is increased and the second ON duty ratio DT2 of the second switching device S2 is decreased. In the case where the reactor current IL is negative and the charge and discharge capacitor voltage V0 is smaller than the charge and discharge capacitor voltage target value V0ref, in order to raise the charge and discharge capacitor voltage V0, the second calculation unit 25 decreases the second calculation value Δduty so that the first ON duty ratio DT1 of the first switching device S1 is decreased and the second ON duty ratio DT2 of the second switching device S2 is increased.

In the Δduty control, the controller 109 changes a magnitude of the change amount of the ON duty ratio difference in accordance with a magnitude of the reactor current IL. In the present embodiment, the second calculation unit 25 changes a magnitude of the second calculation value Δduty calculated based on the charge and discharge capacitor difference voltage V0err, in accordance with the magnitude of the reactor current IL. Specifically, the second calculation unit 25 decreases the magnitude of the second calculation value Δduty calculated based on the charge and discharge capacitor difference voltage V0err, as the magnitude of reactor current IL becomes large.

In the case where the reactor current IL is within a preliminarily set stop range of the Δduty control including zero, the controller 109 stops performing of the Δduty control, but controls the charge and discharge capacitor voltage V0 by performing the phase shift control. In the present embodiment, in the case where the reactor current IL is within the preliminarily set stop range of the Δduty control including zero, the second calculation unit 25 stops a calculation of the second calculation value Δduty, and does not change the switching operation of the switching devices by the second calculation value Δduty. In the case where the reactor current IL is within the stop range of the Δduty control, the third calculation unit 26 calculates the third calculation value θ, and changes the switching operation of the switching devices by the third calculation value θ.

In the present embodiment, the second calculation unit 25 is provided with the current limiting unit 25a and the difference voltage correction unit 25b for the above-mentioned calculation of the second calculation value Δduty according to the reactor current IL. FIG. 11 is a related figure showing a process of the current limiting unit 25a. The current limiting unit 25a outputs a positive value as a reactor current IL* after limitation, in the case where the reactor current IL is positive; outputs a negative value as the reactor current IL* after limitation, in the case where the reactor current IL is negative; and outputs 0 as the reactor current IL* after limitation, in the case where the reactor current IL is within the stop range of the Δduty control including zero (−ILlim <IL<ILlim). In the present embodiment, the current limiting unit 25a sets IL* =IL at the outside of the stop range of the Δduty control.

Based on the charge and discharge capacitor difference voltage V0err and the reactor current IL* after limitation, as shown in the equation (6), the difference voltage correction unit 25b outputs 0 as a difference voltage V0err* after current correction, in the case where the reactor current IL* after limitation is 0; and outputs a value obtained by dividing the charge and discharge capacitor difference voltage V0err by the reactor current IL* after limitation, as the difference voltage V0err* after current correction, in the case where the reactor current IL* after limitation is not 0. Then, the difference voltage V0err* after current correction is inputted into the second controller 25c.

1) In the case of $IL^*=0$ $V0err^*=0$ 2) In the case of
$IL^* \neq 0$ $V0err^*=V0err/IL^*$ (6)

Thus, in the case where the reactor current IL* after limitation is not 0, by dividing the charge and discharge capacitor difference voltage V0err by the reactor current IL* after limitation whose positive or negative sign is the same as the reactor current IL, the sign of a value inputted into the second controller 25c can be changed in accordance with positive/negative of the reactor current IL, and the positive or negative change direction of the second calculation value Δduty can be changed. By dividing the charge and discharge capacitor difference voltage V0err by the reactor current IL* after limitation which is equal to the reactor current IL, in the equation (2), since (DT1 −DT2) is in inverse proportion to the reactor current IL, a computed value of (DT1 −DT2)/C0×IL can be prevented from changing in accordance with the magnitude of the reactor current IL, and a change rate d(V0)/dt of the charge and discharge capacitor voltage V0 can be prevented from changing in accordance with the magnitude of the reactor current IL. Therefore, control behavior of the charge and discharge capacitor voltage V0 is not influenced by the magnitude of the reactor current IL and can be stabilized.

In the case where the reactor current IL is within the stop range of the Δduty control, the reactor current IL* after limitation is set to 0, and the difference voltage V0err* after current correction is set to 0, the second calculation value Δduty outputted from the second controller 25c becomes 0, and the Δduty control stops. In this case, by the phase shift control using the third calculation value θ, the charge and discharge capacitor voltage V0 is controlled to approach the charge and discharge capacitor voltage target value V0ref. On the other hand, in the case where the reactor current IL is outside the stop range of the Δduty control, the charge and discharge capacitor voltage V0 is controlled by the phase shift control and the Δduty control to approach the charge and discharge capacitor voltage target value V0ref.

In the case where the charge and discharge capacitor voltage V0 is larger than the charge and discharge capacitor voltage target value V0ref, in order to reduce the charge and discharge capacitor voltage V0, the third calculation unit 26 decreases the third calculation value θ so as to advance the phase of the ON period of the first switching device S1 and delay the phase of the ON period of the second switching device S2. On the other hand, in the case where the charge and discharge capacitor voltage V0 is smaller than the charge and discharge capacitor voltage target value V0ref, in order to raise the charge and discharge capacitor voltage V0, the third calculation unit 26 increases the third calculation value θ so as to delay the phase of the ON period of the first switching device S1 and advance the phase of the ON period of the second switching device S2.

The upper graph of FIG. 12 shows an execution region of the Δduty control by the second calculation value Δduty, and an execution region of the phase shift control by the third calculation value θ. The vertical axis of the upper graph of FIG. 12 is the reactor current IL. The horizontal axis of the upper graph of FIG. 12 is the first calculation value Duty; when the first calculation value Duty is 0, the ON duty ratios DT1, DT2 of the first and the second switching devices S1, S2 become 0; when the first calculation value Duty is 1, the ON duty ratios DT1, DT2 of the first and the second switching devices S1, S2 become 1. In a region where the reactor current IL becomes within the stop range of the Δduty control from −ILlim to ILlim, the Δduty control is not performed but the phase shift control is performed. In a region where the reactor current IL becomes outside the stop range of the Δduty control, the Δduty control is performed.

In the case where the basis ON duty ratio which is the average value between the first ON duty ratio DT1 of the first switching device S1 and the second ON duty ratio DT2 of the second switching device S2 is less than or equal to a preliminarily set low power determination value DutyL, or in the case where the basis ON duty ratio is larger than or equal to a preliminarily set high power determination value DutyH, the controller 109 stops performing of the phase shift control, but controls the charge and discharge capacitor voltage V0 by performing the Δduty control. In the present embodiment, in the case where the first calculation value Duty which changes the basis ON duty ratio is less than or equal to the low power determination value DutyL, or in the case where the first calculation value Duty is greater than or equal to the high power determination value DutyH, the third calculation unit 26 stops a calculation of the third calculation value θ, and does not change the switching operation of the switching devices by the third calculation value θ. In the case where the first calculation value Duty is less than or equal to the low power determination value DutyL, or in the case where the first calculation value Duty is greater than or equal to the high power determination value DutyH, the second calculation unit 25 calculates the second calculation value Δduty, and changes the switching operation of the switching devices by the third calculation value θ.

In the present embodiment, as shown in the upper graph of FIG. 12, in the region where the reactor current IL becomes outside the stop range of the Δduty control and the low step-up region (or the low step-down region) where the first calculation value Duty becomes less than or equal to the low power determination value DutyL, the phase shift control is not performed but the Δduty control is performed. In the region where the reactor current IL becomes outside the stop range of the Δduty control and the high step-up region (or the high step-down region) where the first calculation value Duty becomes greater than or equal to the high power determination value DutyH, the phase shift control is not performed but the Δduty control is performed. In the region where the reactor current IL becomes outside the stop range of the Δduty control and the region where the first calculation value Duty becomes outside the low step-up region and the high step-up region, the phase shift control and the Δduty control are performed.

The lower graph of FIG. 12 shows a calculation of a limiting value θlim which limits the third calculation value θ in the limiter 27 in order to prevent the first control value SD1 and the second control value SD2 deviating from the range of 0 to 1 in the region where the phase shift control is performed. The vertical axis of the lower graph of FIG. 12 shows the limiting value θlim; the horizontal axis of the lower graph shows the first calculation value Duty.

In the case where the first calculation value Duty is less than 0.5, since Duty—|Δduty| approaches the lower limit (in this example, 0), the limiting value θlim is set to Duty—|Δduty| so that Duty −|Δduty|−θ becomes greater than or equal to the lower limit (0). But in the case where Duty −|Δduty| becomes less than or equal to 0, the limiting value θlim is set to 0. In the case where the first calculation value Duty is greater than or equal to 0.5, since Duty +|Δduty| approaches the upper limit value (in this example, 1), the limiting value θlim is set to 1−Duty −|Δduty| so that Duty+|Δduty| +e becomes less than or equal to the upper limit value (1). But in the case where 1−Duty −|Δduty| becomes less than or equal to 0, the limiting value θlim is set to 0. In the region where the reactor current IL becomes within the stop range of the Δduty control and the Δduty control is not performed, it becomes |Δduty|=0, thereby, it becomes DutyL=0 and DutyH=1. In the region where the Δduty control is performed, it becomes DutyL=|Δduty| and DutyH=1−|Δduty|. Like this, in the region of −|ILlim <IL<ILlim where the Δduty control is not performed, an operating range of the phase shift control is expanded, and it becomes possible to control the charge and discharge capacitor voltage V0 to the charge and discharge capacitor voltage target value V0ref by the phase shift control.

As shown in an equation (7), in the case where a third calculation value θ* before limitation outputted from the third controller 26a becomes less than or equal to a value (−θlim) that multiplied −1 to the limiting value θlim, the limiter 27 sets −θlim to the third calculation value θ after limitation; in the case where the third calculation value θ* before limitation becomes greater than or equal to the limiting value θlim, the limiter 27 sets θlim to the third calculation value θ after limitation; in the case where the third calculation value θ* before limitation becomes within the range of −θlim to θlim, the limiter 27 sets the third calculation value θ* before limitation to the third calculation value θ after limitation as it is.

$$\begin{aligned}&1)\text{ In the case of } \theta^*<=-\theta lim \ \theta=-\theta lim \ 2)\text{ In the}\\&\quad\text{case of } \theta^*>=\theta lim \ \theta=\theta lim \ 3)\text{ In the case}\\&\quad\text{of } -\theta lim<\theta^*<\theta lim \ \theta=\end{aligned} \quad (7)$$

In this way, by applying limitation to the third calculation value θ using the first calculation value Duty and the second calculation value Δduty, the first control value SD1 and the second control value SD2 in which the second calculation value Δduty and the third calculation value θ were reflected can be prevented from becoming outside range of 0 to 1.

At least in the case where the phase difference which is changed by the phase shift control is fixed, the controller 109 controls the charge and discharge capacitor voltage V0 by performing the Δduty control. In the present embodiment, even in the case where the third calculation value θ is fixed to the limiting value θlim by the limiter 27, and in the case where it is the low step-up region or the high step-up region and the third calculation value θ is fixed to 0, the second calculation unit 25 changes the second calculation value Δduty. At least in the case where the ON duty ratio difference which is changed by the Δduty control is fixed, the controller 109 controls the charge and discharge capacitor voltage V0 by performing the phase shift control. In the present embodiment, even in the case where it is within the stop range of the Δduty control and the second calculation value Δduty is fixed to 0, the third calculation unit 26 changes the third calculation value θ. Therefore, the charge and discharge capacitor voltage V0 can be controlled by at least either the Δduty control or the phase shift control.

By providing the controllers 109 as described above, regardless of the power running operation (the step-up operation) or the regenerative operation (the step-down operation), high power or low power, it becomes possible to control the output voltage V2 to the output voltage target value V2ref, and it becomes possible to control the charge and discharge capacitor voltage V0 to the charge and discharge capacitor voltage target value V0ref without depending on the reactor current IL. Therefore, even though the element breakdown voltage of each switching device is reduced, it is possible to avoid the danger of element breakdown more certainly, thereby, the low cost and efficient DC/DC converter 1 can be obtained. Since the current sensor 105 should just have a function to determine the direction of the current which flows through the reactor 12 and have higher detection accuracy than the determination value ILlim which defines the stop range of the Δduty control, a low cost sensor can be used.

Embodiment 2

Figure 13:
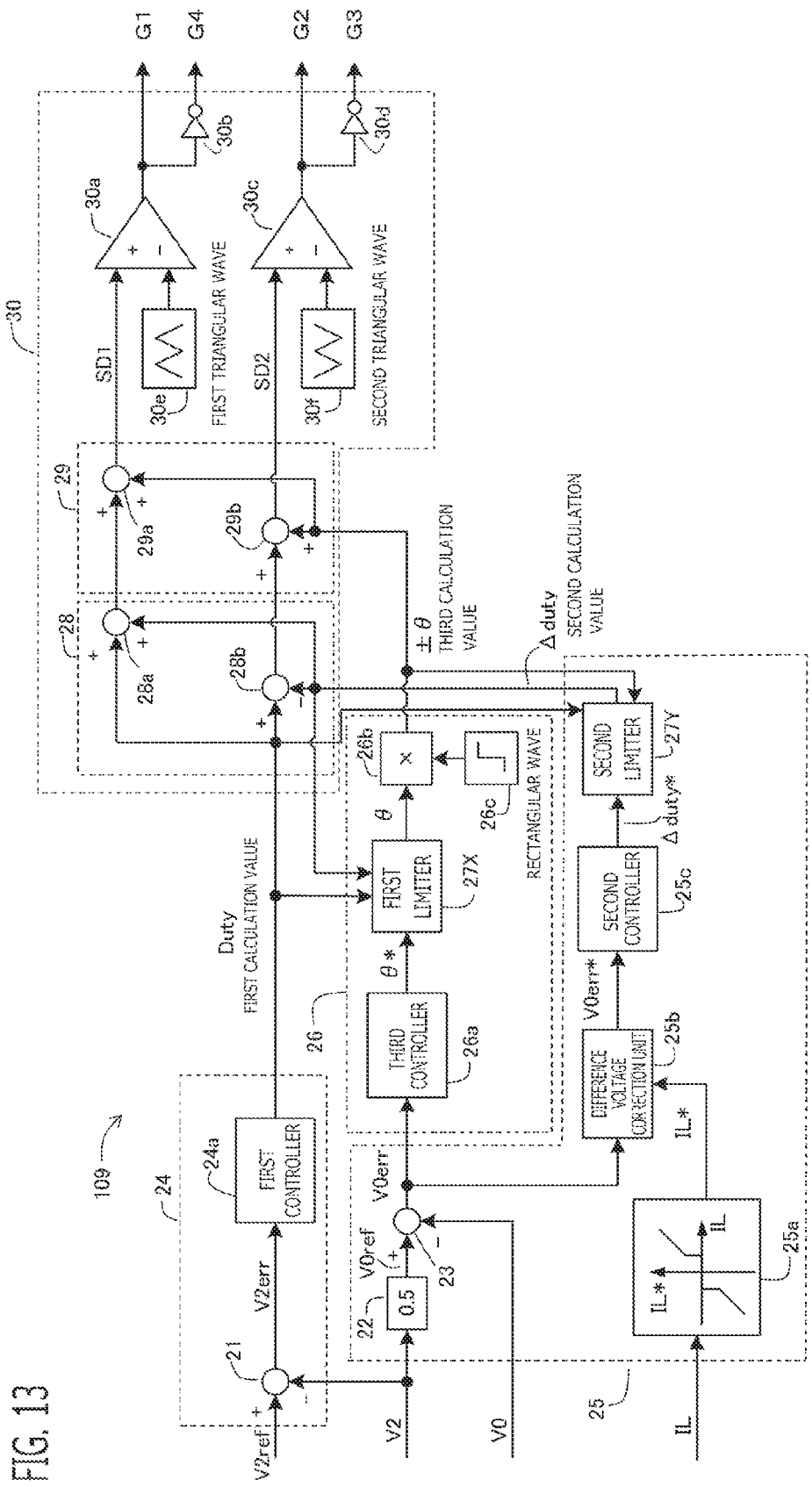
FIG. 13 is a circuit diagram showing a configuration of a controller according to Embodiment 2 of the present invention.

Next, the DC/DC converter 1 according to Embodiment 2 will be explained with reference to drawings. FIG. 13 is a circuit diagram (a block diagram) showing a configuration of the controller 109 according to the present embodiment. The basic configuration of the DC/DC converter 1 according to the present embodiment is the same as that of Embodiment 1; however, a configuration of the limiter 27 and a configuration which performs the phase shift control also in the low step-up region and the high step-up region are different from Embodiment 1.

In the present embodiment, in the phase shift control, the controller 109 performs an upper limitation to a magnitude of a change amount of the phase difference so that a transition order of the operation modes, which are the switching patterns of the switching devices S1 to S4, does not change. The controller 109 is provided with a first limiter 27X and a second limiter 27Y as the limiter. In the low step-up region and the high step-up region, the first limiter 27X performs the upper limitation of the third calculation value θ, which represents the magnitude of the change amount of the phase difference, so that the transition order of the operation modes does not change. In the present embodiment, the first limiter 27X performs an upper and lower limitation by the limiting value θlim to the third calculation value θ before limitation outputted from the third controller 26a, as is the case with the equation (7), and outputs the third calculation value θ after limitation.

Figure 14:
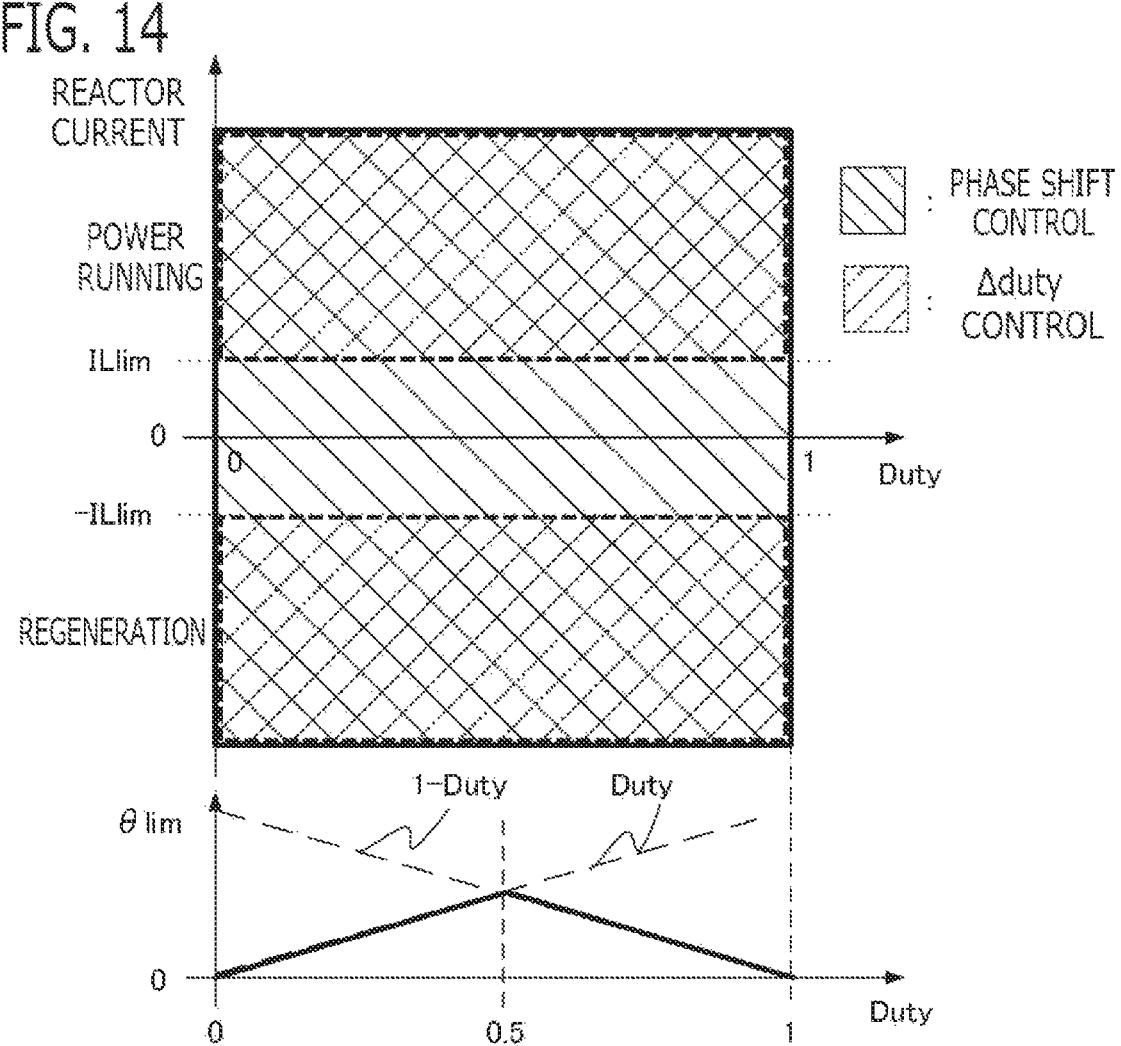
FIG. 14 is an explanation drawing showing an execution region of a second calculation unit and a third calculation unit, and a limiting value of a limiter according to Embodiment 2 of the present invention.

The upper row graph of FIG. 14 shows the execution region of the Δduty control by the second calculation value Δduty, and the execution region of the phase shift control by the third calculation value θ. The vertical axis of the upper graph of FIG. 14 is the reactor current IL. The horizontal axis of the upper graph of FIG. 14 is the first calculation value Duty; when the first calculation value Duty is 0, the ON duty ratios DT1, DT2 of the first and the second switching devices S1, S2 are set to 0; when the first calculation value Duty is 1, the ON duty ratio DT1, DT2 of the first and the second switching devices S1, S2 are set to 1. In the region where the reactor current IL becomes within the stop range of the Δduty control from −ILlim to ILlim, as is the case with Embodiment 1, the Δduty control is not performed but the phase shift control is performed. In the region where the reactor current IL becomes outside the stop range of the Δduty control, the Δduty control is performed.

The lower graph of FIG. 14 shows a calculation of the limiting value θlim, which is used in the first limiter 27X, in a region where both of the Δduty control and the phase shift control are performed. The vertical axis of the lower graph of FIG. 14 shows the limiting value θlim; the horizontal axis of the lower graph shows the first calculation value Duty.

In the case where the first calculation value Duty is less than 0.5, the limiting value θlim is set to the first calculation value Duty so that the transition order of the operation modes does not change (θlim=Duty). In the case where the first calculation value Duty is greater than or equal to 0.5, the limiting value θlim is set to a value obtained by subtracting the first calculation value Duty from 1 so that the transition order of the operation modes does not change (θlim=1−Duty).

Accordingly, in the present embodiment, since the limiting value θlim limits the third calculation value θ so that the transition order of operation modes does not change, it is not necessary to stop the phase shift control in the low step-up region and the high step-up region like Embodiment 1, and the phase shift control can be performed in the whole regions.

The second limiter 27Y limits the second calculation value Δduty so that the first control value SD1 and the second control value SD2 do not become outside the range of the minimum values (in this example, 0) to the maximum value (in this example, 1). In the present embodiment, the second limiter 27Y performs the upper and lower limitation by a second limiting value Δdutylim to the second calculation value Δduty* before limitation outputted from the second controller 25c, and outputs the second calculation value Δduty after limitation.

The second calculation value Δduty* before limitation, the first calculation value Duty, and the third calculation value θ after limitation are inputted into the second limiter 27Y. In the case where the first calculation value Duty is less than 0.5, the second limiting value Δdutylim is set to a value obtained by subtracting the absolute value of the third calculation value θ after limitation from the first calculation value Duty (Δdutylim=Duty −|θ|). In the case where the first calculation value Duty is greater than or equal to 0.5, the second limiting value Δdutylim is set to a value obtained by subtracting the first calculation value Duty and the absolute value of the third calculation value θ after limitation from 1 (Δdutylim =1−Duty −|θ|).

As shown in an equation (8), in the case where the second calculation value Δduty* before limitation outputted from the second controller 25c becomes less than or equal to a value (−Δdutylim) obtained by multiplying −1 to the second limiting value Δdutylim, the second limiter 27Y sets −Δdutylim to the second calculation value Δduty after limitation; in the case where the second calculation value Δduty* before limitation becomes greater than or equal to the second limiting value Δdutylim, the second limiter 27Y sets Δdutylim to the second calculation value Δduty after limitation; in the case where the second calculation value Δduty* before limitation becomes within the range of −Δdutylim to Δdutylim, the second limiter 27Y sets the second calculation value Δduty* before limiting to the second calculation value Δduty after limitation as it is.

$$\begin{aligned}&1)\text{ In the case of }\Delta duty^*<=-\Delta dutylim\Delta duty=-\Delta dutylim\\&2)\text{ In the case of }\Delta duty^*>=\Delta dutylim\Delta duty=\Delta dutylim\\&3)\text{ In the case of }-\Delta dutylim<\Delta duty^*<\Delta dutylim\Delta duty=\Delta duty^*\end{aligned} \quad (8)$$

In this way, by applying limitation to the second calculation value Δduty using the first calculation value Duty and the third calculation value θ, the first control value SD1 and the second control value SD2 in which the second calculation value Δduty and the third calculation value θ were reflected can be prevented from becoming outside range of 0 to 1.

Even in the case where the third calculation value θ is fixed to the limiting value θlim by the first limiter 27X, the second calculation unit 25 changes the second calculation value Δduty. Even in the case where it is within the stop range of the Δduty control and the second calculation value Δduty is fixed to 0, and in the case where the second calculation value Δduty is fixed to the second limiting value Δdutylim by the second limiter 27Y, the third calculation unit 26 changes the third calculation value θ. Therefore, the charge and discharge capacitor voltage V0 can be controllable by at least either the second calculation value Δduty or the third calculation value θ.

Even in the present embodiment, as is the case with Embodiment 1, regardless of the power running operation (the step-up operation) or the regenerative operation (the step-down operation), high power or low power, it becomes possible to control the output voltage V2 to the output voltage target value V2ref, and it becomes possible to control the charge and discharge capacitor voltage V0 to the charge and discharge capacitor voltage target value V0ref without depending on the reactor current IL. Therefore, even though the element breakdown voltage of each switching device is reduced, it is possible to avoid the danger of element breakdown more certainly, thereby, the low cost and efficient DC/DC converter 1 can be obtained. Since the current sensor 105 should have a function to determine the direction of the current which flows through the reactor 12 and have higher detection accuracy than the determination value ILlim which defines the stop range of the Δduty control, a low cost sensor can be used.

Embodiment 3

Figure 15:
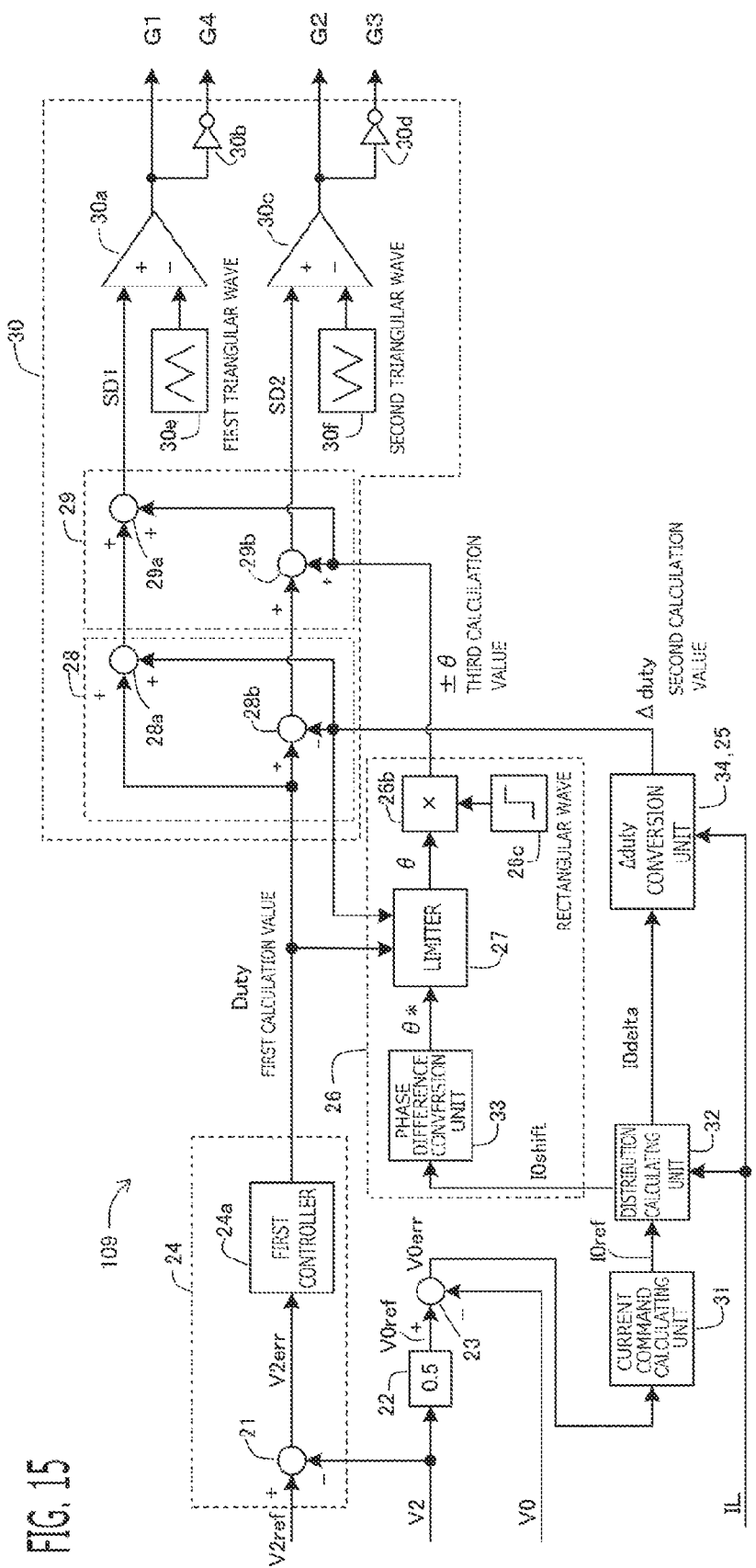
FIG. 15 is a circuit diagram showing a configuration of a controller according to Embodiment 3 of the present invention.

Next, the DC/DC converter 1 according to Embodiment 3 will be explained with reference to drawings. FIG. 15 is a circuit diagram (a block diagram) showing a configuration of the controller 109 according to the present embodiment. The explanation for constituent parts the same as those in Embodiment 1 will be omitted. The basic configuration of the DC/DC converter 1 according to the present embodiment is the same as that of Embodiment 1; however, a configuration that the controller 109 calculates a current command value I0ref which flows into the charge and discharge capacitor 101a as a common intermediate control parameter in the Δduty control and the phase shift control, and changes the ON duty ratio difference and the phase difference based on the current command value I0ref is different from Embodiment 1.

That is to say, in the Δduty control and the phase shift control, the controller 109 changes the current command value I0ref (hereinafter, referred to as the charge and discharge capacitor current command value I0ref) which flows into the charge and discharge capacitor 101a so that the detection value of the charge and discharge capacitor voltage V0 approaches the charge and discharge capacitor voltage target value V0ref. Then, the controller 109 changes the ON duty ratio difference based on the charge and discharge capacitor current command value I0ref, and changes the phase difference based on the charge and discharge capacitor current command value I0ref.

Since the charge and discharge capacitor current IC0 is proportional to a time change speed (dV0/dt) of the charge and discharge capacitor voltage V0, it is an important parameter for controlling the charge and discharge capacitor voltage V0. According to the above-mentioned configuration, since the charge and discharge capacitor current command value I0ref, which is the common intermediate control parameter, is calculated in the Δduty control and the phase shift control, and the ON duty ratio difference and the phase difference are changed based on the charge and discharge capacitor current command value I0ref, it is possible to improve the control accuracy of the charge and discharge capacitor voltage V0 by two kinds of control methods.

The controller 109 distributes the charge and discharge capacitor current command value I0ref to a current command value I0delta for the Δduty control and a current command value I0shift for the phase shift control. Then, the controller 109 changes the ON duty ratio difference based on the current command value I0delta for the Δduty control, and changes the phase difference based on the current command value I0shift for the phase shift control.

According to this configuration, since the charge and discharge capacitor current command value I0ref is distributed and the Δduty control and the phase shift control are performed, even if two kinds of control methods are used, the control behavior of the charge and discharge capacitor voltage V0 can be stabilized.

In the present embodiment, as shown in FIG. 15, the controller 109 is provided with a current command calculating unit 31. The current command calculating unit 31 calculates the charge and discharge capacitor current command value I0ref based on the difference voltage V0err (the charge and discharge capacitor difference voltage V0err) between the detection value of the charge and discharge capacitor voltage V0 and the charge and discharge capacitor voltage target value V0ref. The current command calculating unit 31 calculates the charge and discharge capacitor current command value I0ref by performing a feedback control, such as P control, PI control, and PID control, to the charge and discharge capacitor difference voltage V0err.

The controller 109 is provided with a distribution calculating unit 32. The distribution calculating unit 32 distributes the charge and discharge capacitor current command value I0ref to the current command value I0delta for the Δduty control and the current command value I0shift for the phase shift control.

In the present embodiment, the distribution calculating unit 32 changes a distribution ratio Ri between the current command value I0delta for the Δduty control and the current command value I0shift for the phase shift control in accordance with the reactor current IL detected by the current sensor 105. In this example, the distribution ratio Ri is a distribution ratio of the current command value I0delta for the Δduty control to the charge and discharge capacitor current command value I0ref, and is set to a value of greater than or equal to 0 and less than or equal to 1. As shown in an equation (9), the distribution calculating unit 32 sets a value obtained by multiplying the charge and discharge capacitor current command value I0ref to the distribution ratio Ri, to the current command value I0delta for the Δduty control, and sets a value obtained by multiplying the charge and discharge capacitor current command value I0ref to a value obtained by subtracting the distribution ratio Ri from 1, to the current command value I0shift for the phase shift control.

$$I0delta = Ri \times I0ref \quad I0shift = (1-Ri) \times I0ref \quad 0 <= Ri <= 1 \tag{9}$$

Figure 16:
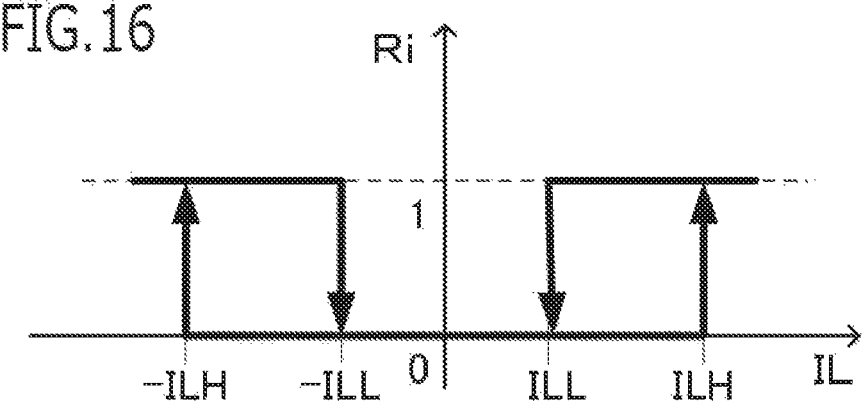
FIG. 16 is a figure explaining setting of a distribution ratio in accordance with reactor current according to Embodiment 3 of the present invention.
Figure 17:
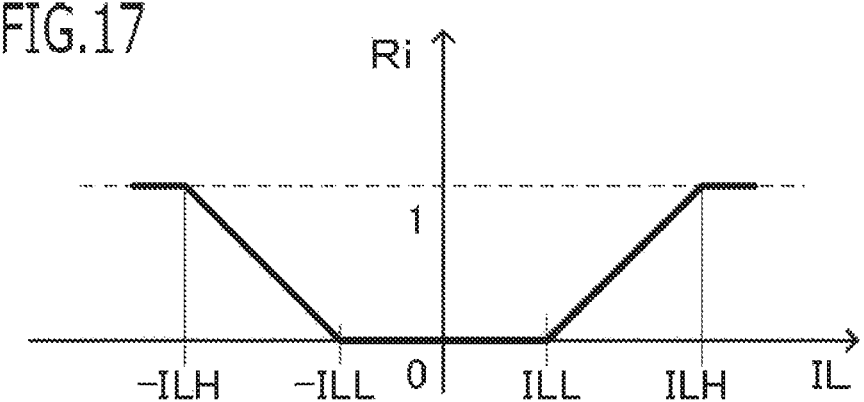
FIG. 17 is a figure explaining setting of a distribution ratio in accordance with reactor current according to Embodiment 3 of the present invention.
Figure 18:
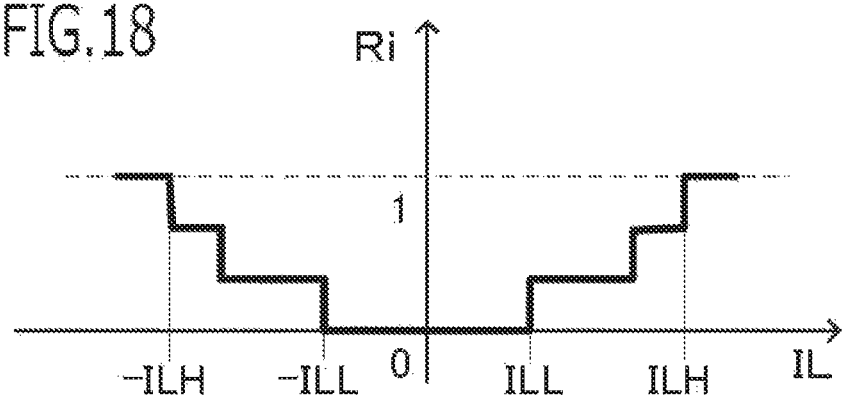
FIG. 18 is a figure explaining setting of a distribution ratio in accordance with reactor current according to Embodiment 3 of the present invention.

As shown in examples of FIG. 16 to FIG. 18, in the case where the reactor current IL is within the preliminarily set stop range of the Δduty control including 0, the distribution calculating unit 32 sets the distribution ratio Ri to 0; in the case where the reactor current IL is outside the stop range of the Δduty control, the distribution calculating unit 32 sets the distribution ratio Ri to a larger value than 0.

When the distribution ratio Ri is set to 0, the current command value I0delta for the Δduty control becomes 0, thereby, as described later, the ON duty ratio difference becomes 0, and the Δduty control is stopped. On the other hand, when the distribution ratio Ri is set to a value larger than 0, the current command value I0delta for the Δduty control becomes a value larger than 0 or a value smaller than 0, thereby, as described later, the ON duty ratio difference becomes a value larger than 0 or a value smaller than 0, and the Δduty control is operated.

According to this configuration, in a region where the reactor current IL becomes within the stop range of the Δduty control, as is the case with Embodiments 1, 2, the Δduty control is not performed but the phase shift control is performed. In a region where the reactor current IL becomes outside the stop range of the Δduty control, the Δduty control is performed. In this case, since it is managed with the distribution ratio Ri, the control amount of the stopped Δduty control can be automatically distributed to the control amount of the phase shift control.

In FIG. 16 to FIG. 18, the horizontal axis is the reactor current IL, and the vertical axis is the distribution ratio Ri. In examples shown in FIG. 16 to FIG. 18, in the stop range of the Δduty control where the reactor current IL becomes within the range of −ILL to ILL (−ILL <=IL<=ILL), the distribution ratio Ri is set to 0, the Δduty control is stopped and the phase shift control is operated. In the range where the reactor current IL becomes less than or equal to −ILH or greater than or equal to ILH (IL<=−ILH, ILH <=IL), the distribution ratio Ri is set to one, the Δduty control is operated and the phase shift control is stopped.

In the range (−ILH <=IL<=−ILL) where the reactor current IL becomes within the range of −ILH to −ILL, and the range (ILL<=IL<=ILH) where the reactor current IL becomes within the range of ILL to ILH; in example shown in FIG. 16, the distribution ratio Ri is switched between 0 and 1 by hysteresis determination; in example shown in FIG. 17, the distribution ratio Ri is changed between 0 and 1 gradually; in example shown in FIG. 18, the distribution ratio Ri is changed between 0 and 1 stepwise.

The third calculation unit 26 which performs the phase shift control is provided with a phase difference conversion unit 33. The phase difference conversion unit 33 converts the current command value I0shift for the phase shift control into the phase difference. An equation (10) is obtained by rearranging the equation (5) derived above, with regard to the phase shift amount from the basis phase difference 8 which is 180 degrees. Here, since a value obtained by multiplying the time change speed dV0/dt of the charge and discharge capacitor voltage V0 to the capacity C0 of the charge and discharge capacitor is equal to the charge and discharge capacitor current IC0, it is replaced to the charge and discharge capacitor current IC0. By using the equation (10), the charge and discharge capacitor current IC0 can be converted into the phase shift amount Θ; the conversion equations differ depending on whether the step-up ratio N (the step-down ratio N) is less than twice.

$$\Theta = \frac{L \cdot V2}{Tsw \cdot (V2-V1)^2} \cdot C0 \cdot \frac{dV0}{dt} = \tag{10}$$

$$\frac{L \cdot V2}{Tsw \cdot (V2-V1)^2} \cdot IC0 \quad \left(N = \frac{V2}{V1} < 2\right)$$

$$\Theta = \frac{L \cdot V1}{Tsw \cdot V2^2} \cdot C0 \cdot \frac{dV0}{dt} = \frac{L \cdot V1}{Tsw \cdot V2^2} \cdot IC0 \quad \left(N = \frac{V2}{V1} \geq 2\right)$$

Then, as shown in an equation (11), the phase difference conversion unit 33 converts the current command value I0shift for the phase shift control into the third calculation value θ* before limitation, using a phase difference conversion coefficient Z calculated based on the input voltage V1 and the output voltage V2. Here, the phase difference conversion unit 33 switches a calculation equation of the phase difference conversion coefficient Z, depending on whether the step-up ratio N (the step-down ratio N) is less than twice.

$$\theta^* = Z \cdot I0shift \quad (11)$$

1) In a case of $N = \frac{V2}{V1} < 2$ $$Z = \frac{L \cdot V2}{Tsw \cdot (V2 - V1)^2}$$

2) In a case of $N = \frac{V2}{V1} \geq 2$ $$Z = \frac{L \cdot V1}{Tsw \cdot V2^2}$$

As is the case with Embodiment 1, as shown in an equation (7), in the case where the third calculation value $\theta^*$ before limitation outputted from the phase difference conversion unit 33 becomes less than or equal to a value ($-\theta$lim) that multiplied $-1$ to the limiting value $\theta$lim, the limiter 27 sets $-\theta$lim to the third calculation value $\theta$ after limitation; in the case where the third calculation value before limitation becomes greater than or equal to the limiting value $\theta$lim, the limiter 27 sets $\theta$lim to the third calculation value $\theta$ after limitation; in the case where the third calculation value $\theta^*$ before limitation becomes within the range of $-\theta$lim to $\theta$lim, the limiter 27 sets the third calculation value $\theta^*$ before limitation to the third calculation value $\theta$ after limitation as it is. The limiting value $\theta$lim is set, as explained using the lower graph of FIG. 12. According to this configuration, as is the case with Embodiment 1, the transition order of the operation modes, which are switching patterns of the switching devices S1 to S4, can be prevented from changing.

Then, as is the case with Embodiment 1, the rectangular wave multiplier 26b calculates the final third calculation value $\pm\theta$ by multiplying the rectangular wave of $\pm 1$ outputted from the rectangular wave generator 26c to the third calculation value $\theta$.

The second calculation unit 25 which performs the $\Delta$duty control is provided with a $\Delta$duty conversion unit 34. The $\Delta$duty conversion unit 34 converts the current command value I0delta for the $\Delta$duty control into the ON duty ratio difference. An equation (12) is obtained by picking out the second line of the equation (1) derived above and rearranging with regard to (DT1 −DT2) which becomes the ON duty ratio difference. Here, as is the case with the equation (10), C0×dV0/dt is replaced to the charge and discharge capacitor current IC0. Using the equation (12), the charge and discharge capacitor current IC0 can be converted into the ON duty ratio difference.

$$\frac{dV0}{dt} = \frac{DT1 - DT2}{C0} \cdot IL \quad (12)$$

$$DT1 - DT2 = C0 \cdot \frac{dV0}{dt} \cdot \frac{1}{IL} = IC0 \cdot \frac{1}{IL}$$

Then, as shown in an equation (13), the $\Delta$duty conversion unit 34 calculates a value obtained by dividing the current command value I0delta for the $\Delta$duty control by the reactor current IL, as the second calculation value $\Delta$duty. Here, in the case where the reactor current IL is within the stop range of the $\Delta$duty control, since the current command value I0delta for the $\Delta$duty control is set to 0, the second calculation value $\Delta$duty is set to 0. According to this configuration, as is the case with Embodiment 1, the ON duty ratio difference is changed in accordance with the reactor current IL, and the positive or negative change direction of the ON duty ratio difference is changed in accordance with the current direction of the reactor current IL.

$$\Delta duty = I0delta/IL \quad (13)$$

As is the case with Embodiment 2, the second limiter 27Y may perform the upper and lower limitation by the second limiting value $\Delta$dutylim to the second calculation value $\Delta$duty outputted from the $\Delta$duty conversion unit 34.

Since the configuration of the first calculation unit 24, the switching control unit 30 and the like is the same as that of Embodiment 1, the explanation will be omitted.

Embodiment 4

Next, the DC/DC converter 1 according to Embodiment 4 will be explained with reference to drawings. The explanation for constituent parts the same as those in Embodiment 3 will be omitted. The basic configuration of the DC/DC converter 1 according to the present embodiment is the same as that of Embodiment 3; however, a processing of the distribution calculating unit 32 differs from Embodiment 3.

That is to say, in the case of performing the upper and lower limitation to one or both of the ON duty ratio difference and the phase difference, the distribution calculating unit 32 distributes a part, which exceeded the upper and lower limitation value in the phase difference or the ON duty ratio difference to which the upper and lower limitation was performed, to the current command value I0delta for the $\Delta$duty control or the current command value I0shift for the phase shift control corresponding to the phase difference or the ON duty ratio difference to which the upper and lower limitation is not performed.

According to this configuration, since the part of the current command value to which the upper and lower limitation is performed can be distributed to the current command value to which the upper and lower limitation is not performed, and it is possible to reflect in control of the charge and discharge capacitor voltage V0, the control behavior of the charge and discharge capacitor voltage V0 can be stabilized.

In the present embodiment, in the case where a temporary set value of the phase difference, which is temporarily set corresponding to the current command value I0ref, is upper and lower limited, the distribution calculating unit 32 distributes the part of the current command value corresponding to the part which exceeded the upper and lower limitation value in the temporary set value of the phase difference, to the current command value I0delta for the $\Delta$duty control, and distributes a remaining part of the current command value to the current command value I0shift for the phase shift control.

Figure 19:
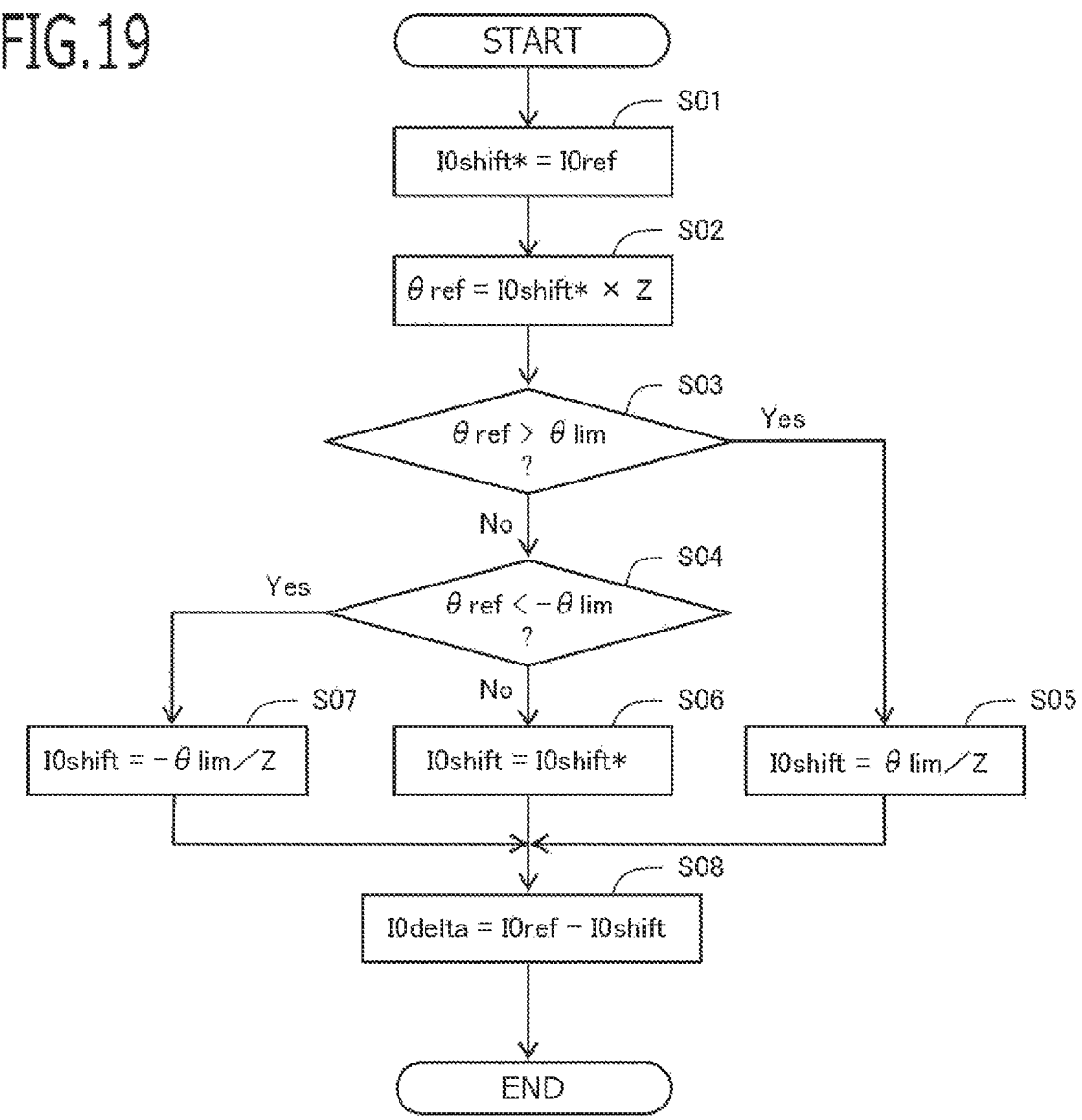
FIG. 19 is a flow chart showing a processing of a distribution calculating unit according to Embodiment 4 of the present invention.

It will be explained in detail using the flow chart shown in FIG. 19. In the step S01, the distribution calculating unit 32 sets the current command value I0ref to a temporary current command value I0shift* for the phase shift control. Next, in the step S02, the distribution calculating unit 32 calculates a temporary set value $\theta$ref of the third calculation value by multiplying the phase difference conversion coefficient Z, which was calculated depending on whether the step-up ratio N (the step-down ratio N) is less than twice as shown in an equation (11), to the temporary current command value I0shift* for the phase shift control.

Next, in the step S03, the distribution calculating unit 32 determines whether or not the temporary set value $\theta$ref of the third calculation value exceeds the upper limitation value $\theta$lim used in the limiter 27. In the case where it is determined that the temporary set value θref of the third calculation value exceeds the upper limitation value θlim (in the step S03: Yes), in the step S05, the distribution calculating unit 32 sets a value obtained by dividing the upper limitation value θlim by the phase difference conversion coefficient Z, to the current command value I0shift for the phase shift control.

In the case where it is determined that the temporary set value θref of the third calculation value does not exceeds the upper limitation value θlim (in the step S03: No), in the step S04, the distribution calculating unit 32 determines whether or not the temporary set value θref of the third calculation value is lower than the lower limitation value −θlim used in the limiter 27. In the case where it is determined that the temporary set value θref of the third calculation value is lower than the lower limitation value −θlim (in the step S04: Yes), in the step S07, the distribution calculating unit 32 sets a value obtained by dividing the lower limitation value −θlim by the phase difference conversion coefficient Z, to the current command value I0shift for the phase shift control.

In the case where it is determined that the temporary set value θref of the third calculation value is not lower than the lower limitation value −θlim (in the step S04: No), in the step S06, the distribution calculating unit 32 sets the temporary current command value I0shift* for the phase shift control to the current command value I0shift for the phase shift control.

In the step S08, the distribution calculating unit 32 sets a value obtained by subtracting the current command value I0shift for the phase shift control from the current command value I0ref, to the current command value I0delta for the Δduty control.

Alternatively, as is the case with Embodiment 3, the distribution calculating unit 32 may be configured to distribute the charge and discharge capacitor current command value I0ref to the current command value I0delta for the Δduty control and the current command value I0shift for the phase shift control depending on the distribution ratio Ri; and the distribution calculating unit 32 may be configured to distribute additionally apart of the current command value, which is corresponding to an exceeded part of the third calculation value θ to which the upper and lower limitation is performed in the limiter 27, to the current command value I0delta for the Δduty control.

For example, in the case where the third calculation value θ* before limitation is upper limited by the limiting value θlim, the distribution calculating unit 32 adds additionally a value obtained by dividing the exceeded part (θ* −θlim) by the phase difference conversion coefficient Z, to the current command value I0delta for the Δduty control. Or, in the case where the third calculation value θ* before limitation is lower limited by the limiting value −θlim, the distribution calculating unit 32 adds additionally a value obtained by dividing the exceeded part (θ* +θlim) by the phase difference conversion coefficient Z, to the current command value I0delta for the Δduty control.

Alternatively, as is the case with Embodiment 3, the distribution calculating unit 32 may be configured to distribute the charge and discharge capacitor current command value I0ref to the current command value I0delta for the Δduty control and the current command value I0shift for the phase shift control depending on the distribution ratio Ri; and as is the case with Embodiment 2, in the second limiter 27Y, the upper and lower limitation may be performed by the second limiting value Δdutylim to the second calculation value Δduty. In this case, a part of the current command value, which is corresponding to an exceeded part of the second calculation value Δduty to which the upper and lower limitation is performed in the second limiter 27Y, may be additionally distributed to the current command value I0shift for the phase shift control.

For example, in the case where the second calculation value Δduty* before limitation is upper limited by the second limiting value Δdutylim, the distribution calculating unit 32 adds additionally a value obtained by multiplying the reactor current IL to the exceeded part (Δduty* −Δdutylim), to the current command value I0shift for the phase shift control. Or, in the case where the second calculation value Δduty* before limitation is lower limited by the second limiting value −Δdutylim, the distribution calculating unit 32 adds additionally a value obtained by multiplying the reactor current IL to the exceeded part (Δduty* +Δdutylim), to the current command value I0shift for the phase shift control.

Other Embodiments

Lastly, other embodiments of the present invention will be explained. Each of the configurations of embodiments to be explained below is not limited to be separately utilized but can be utilized in combination with the configurations of other embodiments as long as no discrepancy occurs.

(1) In each of the foregoing embodiments, there has been explained the case where the battery 2 is connected between the input side positive electrode terminal 1a and the input side negative electrode terminal 1b of low voltage side, and the electric motor 3 is connected between the output side positive electrode terminal 1c and the output side negative electrode terminal 1d of high voltage side. However, embodiments of the present invention are not limited to the foregoing case. That is to say, between the input side positive electrode terminal 1a and the input side negative electrode terminal 1b of low voltage side, any electric apparatuses which supply or consume direct current power, such as a battery or an electric motor, may be connected; between the output side positive electrode terminal 1c and the output side negative electrode terminals 1d of high voltage side, any electric apparatuses which supply or consume direct current power, such as a battery or an electric motor, may be connected. For example, an electric motor may be connected between the input side positive electrode terminal 1a and the input side negative electrode terminal 1b of low voltage side; a battery may be connected between the output side positive electrode terminal 1c and the output side negative electrode terminal 1d of high voltage side.

(2) In each of the foregoing embodiments, there has been explained the case where the DC/DC converter 1 can perform both of the step-up operation and the step-down operation; and all of the first to the fourth semiconductor circuits have the function of the switching device and the function of the diode element. However, embodiments of the present invention are not limited to the foregoing case. That is to say, the DC/DC converter 1 may perform only the step-up operation; only the first and the second semiconductor circuits may have the function of the switching device, and only the third and the fourth semiconductor circuits may have the function of the diode element. In this case, in the upper graphs of FIG. 12 and FIG. 14, the controller 109 is configured to perform the control only in the region where the reactor current IL is positive; in FIG. 1, the controller 109 is configured to generate the first and the second gate signals G1, G2, and not to generate the third and the fourth gate signals G3, G4. The controller 109 calculates the first calculation value Duty for performing the first ON duty ratio change which changes the basis ON duty ratio which is the average value between the ON duty ratio of the first semiconductor circuit and the ON duty ratio of the second semiconductor circuit in the state of the same ON duty ratio difference and the same phase difference; calculates the second calculation value Δduty for performing the first ON duty ratio difference change which changes the ON duty ratio difference between the ON duty ratio of the first semiconductor circuit and the ON duty ratio of the second semiconductor circuit; calculates the third calculation value θ for performing the first phase difference change which changes the phase difference between the phase of the ON period of the first semiconductor circuit and the phase of the ON period of the second semiconductor circuit; and controls the switching operation of the first and the second semiconductor circuits which have the on-off switching function.

Alternatively, the DC/DC converter 1 may perform only the step-down operation; only the first and the second semiconductor circuits may have the function of the diode element, and only the third and the fourth semiconductor circuits may have the function of the switching device. In this case, in the upper graphs of FIG. 12 and FIG. 14, the controller 109 is configured to perform the control only in the region where the reactor current IL is negative; in FIG. 1, the controller 109 is configured to generate the third and the fourth gate signal G3, G4, and not to generate the first and the second gate signals G1, G2. The controller 109 calculates the first calculation value Duty for performing the second ON duty ratio change which changes the basis ON duty ratio which is the average value between the ON duty ratio of the third semiconductor circuit and the ON duty ratio of the fourth semiconductor circuit in the state of the same ON duty ratio difference and the same phase difference; calculates the second calculation value Δduty for performing the second ON duty ratio difference change which changes the ON duty ratio difference between the ON duty ratio of the third semiconductor circuit and the ON duty ratio of the fourth semiconductor circuit; calculates the third calculation value θ for performing the second phase difference change which changes the phase difference between the phase of the ON period of the third semiconductor circuit and the phase of the ON period of the fourth semiconductor circuit; and controls the switching operation of the third and the fourth semiconductor circuits which have the on-off switching function.

(3) In each of the foregoing embodiments, there has been explained the case where the first voltage sensor 103 detects the voltage between terminals of the output side smoothing capacitor 108 (the output voltage V2); and the controller 109 controls the output voltage V2 by execution of the basis duty control which changes the basis ON duty ratio (the first calculation value Duty) so that the detection value of the output voltage V2 as the high side voltage approaches the output voltage target value V2ref as the command value of high side voltage. However, embodiments of the present invention are not limited to the foregoing case. That is to say, the first voltage sensor 103 may be configured to detect the voltage between terminals of the input side smoothing capacitor 11 (the input voltage V1); and the controller 109 may be configured to control the input voltage V1 by execution of the basis duty control which changes the basis ON duty ratio (the first calculation value Duty) so that the detection value of the input voltage V1 as the low side voltage approaches the input voltage target value V1ref as the command value of low side voltage. In this case, an electric motor may be connected between the input side positive electrode terminal 1a and the input side negative electrode terminals 1b of low voltage side; a battery may be connected between the output side positive electrode terminal 1c and the output side negative electrode terminals 1d of high voltage side.

(4) In each of the foregoing embodiments, there has been explained the case where in the Δduty control, the controller 109 changes the ON duty ratio difference so that the detection value of the charge and discharge capacitor voltage V0 approaches the charge and discharge capacitor voltage target value V0ref; and in the phase shift control, the controller 109 changes the phase difference so that the detection value of the charge and discharge capacitor voltage V0 approaches the charge and discharge capacitor voltage target value V0ref. However, embodiments of the present invention are not limited to the foregoing case. That is to say, in the Δduty control, the controller 109 may be configured to change the ON duty ratio difference in feedforward based on a set command value; and in the phase shift control, the controller 109 may be configured to change the phase difference in feedforward based on a set command value.

(5) In each of the foregoing embodiments, there has been explained the case where the controller 109 changes the basis ON duty ratio so that the detection value of the output voltage V2 approaches the output voltage target value V2ref in the basis duty control. However, embodiments of the present invention are not limited to the foregoing case. That is to say, in the basis duty control, the controller 109 may be configured to change the basis ON duty ratio in feedforward based on a set command value.

(6) In each of the foregoing embodiments, there has been explained the case where the controller 109 calculates the first control value SD1 and the second control value SD2 based on the first calculation value Duty, the second calculation value Δduty, and the third calculation value θ; and the controller 109 performs on/off control of each switching device by the comparison between the first triangular wave and the first control value SD1, and the comparison between the second triangular wave and the second control value SD2. However, embodiments of the present invention are not limited to the foregoing case. That is to say, the controller 109 may be configured to realize the ON duty ratio difference, the phase difference, and the basis ON duty ratio in the Δduty control, the phase shift control, and the basis duty control by methods other than the triangular wave comparison. For example, in each of the Δduty control, the phase shift control, and the basis duty control, as explained using FIG. 7 to FIG. 10, the controller 109 may determine the transition order of the operation modes 1 to 4 which are the switching patterns of the switching devices S1 to S4, based on either the step-up operation or the step-down operation, and the step-up ratio or the step-down ratio; and the controller 109 may adjust the length of the period of each determined operation mode 1 to 4, based on a command value of the ON duty ratio difference, a command value of the phase difference, and a command value of the basis ON duty ratio, which are calculated based on each difference voltage and the like; thereby, the controller 109 may realize the ON duty ratio difference of the command value, the phase difference of the command value, and the basis ON duty ratio of the command value.

Various modifications and alterations of this invention will be apparent to those skilled in the art without departing from the scope and spirit of this invention, and it should be understood that this is not limited to the illustrative embodiments set forth herein.

What is claimed is:
1. A DC/DC converter comprising:
a low-voltage side capacitor which holds low side voltage; a high-voltage side capacitor which holds high side voltage, and whose a negative electrode side terminal was connected to a negative electrode side terminal of the low-voltage side capacitor; a first semiconductor circuit whose a first end was connected to the negative electrode side terminal of the low-voltage side capacitor; a second semiconductor circuit whose a first end was connected to a second end of the first semiconductor circuit, and whose a second end was connected to a positive electrode side terminal of the low-voltage side capacitor via a reactor; a third semiconductor circuit whose a first end was connected to the second end of the second semiconductor circuit; a fourth semiconductor circuit whose a first end was connected to a second end of the third semiconductor circuit, and whose a second end was connected to a positive electrode side terminal of the high-voltage side capacitor; a charge and discharge capacitor whose a first end was connected to an intermediate connection point between the first semiconductor circuit and the second semiconductor circuit, and whose a second end was connected to an intermediate connection point between the third semiconductor circuit and the fourth semiconductor circuit; and a controller that controls each of the semiconductor circuits, wherein the DC/DC converter is capable of operation of one or both of a step-up operation which converts an inputted voltage of the low-voltage side capacitor into a stepped up voltage and outputs to the high-voltage side capacitor by an on-off switching function of the switching element of the first and second semiconductor circuits, by having a function of a switching element in each of the first and second semiconductor circuits and having a function of a diode element in each of the third and fourth semiconductor circuits, and a step-down operation which converts an inputted voltage of the high-voltage side capacitor into a stepped down voltage and outputs to the low-voltage side capacitor by an on-off switching function of the switching element of the third and fourth semiconductor circuits, by having a function of a switching element in each of the third and fourth semiconductor circuits and having a function of a diode element in each of the first and second semiconductor circuits, wherein the controller controls an ON duty ratio and a phase of ON period in each of the semiconductor circuits of one or both of the first and second semiconductor circuits which have the on-off switching function, and the third and fourth semiconductor circuits which have the on-off switching function, and wherein the controller controls a voltage of the charge and discharge capacitor, by performing a Δduty control which performs one or both of a first ON duty ratio difference change which changes an ON duty ratio difference between the ON duty ratio of the first semiconductor circuit and the ON duty ratio of the second semiconductor circuit, and a second ON duty ratio difference change which changes an ON duty ratio difference between the ON duty ratio of the third semiconductor circuit and the ON duty ratio of the fourth semiconductor circuit, and a phase shift control which performs one or both of a first phase difference change which changes a phase difference between the phase of ON period of the first semiconductor circuit and the phase of ON period of the second semiconductor circuit, and a second phase difference change which changes a phase difference between the phase of ON period of the third semiconductor circuit and the phase of ON period of the fourth semiconductor circuit.

2. The DC/DC converter according to claim 1,
wherein the controller changes the ON duty ratio difference so that a voltage detection value of the charge and discharge capacitor approaches a voltage command value of the charge and discharge capacitor in the Δduty control, and changes the phase difference so that the voltage detection value of the charge and discharge capacitor approaches the voltage command value of the charge and discharge capacitor in the phase shift control.

3. The DC/DC converter according to claim 1,
wherein the controller controls the high side voltage or the low side voltage by performing a basis duty control which performs one or both of
a first ON duty ratio change which changes a basis ON duty ratio which is an average value between the ON duty ratio of the first semiconductor circuit and the ON duty ratio of the second semiconductor circuit, in the state of the same ON duty ratio difference and the same phase difference, and
a second ON duty ratio change which changes a basis ON duty ratio which is an average value between the ON duty ratio of the third semiconductor circuit and the ON duty ratio of the fourth semiconductor circuit, in the state of the same ON duty ratio difference and the same phase difference,
so that a voltage detection value of the high side voltage approaches a command value of the high side voltage, or a voltage detection value of the low side voltage approaches a command value of the low side voltage.

4. The DC/DC converter according to claim 1, further comprising a reactor current detector that detects a current flowing through the reactor,
wherein the controller changes the ON duty ratio difference in accordance with the current of the reactor detected by the reactor current detector in the Δduty control, and
in the case where the current of the reactor detected by the reactor current detector is within a preliminarily set stop range of the Δduty control including 0, the controller stops performing of the Δduty control, but controls the voltage of the charge and discharge capacitor by performing the phase shift control.

5. The DC/DC converter according to claim 1, further comprising a reactor current detector that detects a current direction flowing through the reactor,
wherein the controller changes a positive or negative change direction of the ON duty ratio difference in accordance with the current direction detected by the reactor current detector in the Δduty control.

6. The DC/DC converter according to claim 1, further comprising a reactor current detector that detects a current flowing through the reactor,
wherein the controller changes a magnitude of a change amount of the ON duty ratio difference in accordance with a magnitude of the reactor current detected by the reactor current detector in the Δduty control.

7. The DC/DC converter according to claim 1,
wherein in the case where a basis ON duty ratio which is an average value between the ON duty ratio of the first semiconductor circuit and the ON duty ratio of the second semiconductor circuit, or a basis ON duty ratio which is an average value between the ON duty ratio of the third semiconductor circuit and the ON duty ratio of the fourth semiconductor circuit, is smaller than or equal to a preliminarily set low power determination value; or in the case where the basis ON duty ratio is larger than or equal to a preliminarily set high power determination value, the controller controls the voltage of the charge and discharge capacitor by performing the Δduty control, while stopping performing of the phase shift control.

8. The DC/DC converter according to claim 1,
wherein the controller performs an upper limitation to a magnitude of a change amount of the phase difference so that a transition order of operation modes, which are switching patterns of the semiconductor circuits, does not change in the phase shift control.

9. The DC/DC converter according to claim 1,
wherein at least in the case where the phase difference which is changed by the phase shift control is fixed, the controller controls the voltage of the charge and discharge capacitor by performing the Δduty control; and
at least in the case where the ON duty ratio difference which is changed by the Δduty control is fixed, the controller controls the voltage of the charge and discharge capacitor by performing the phase shift control.

10. The DC/DC converter according to claim 1,
wherein all of the first to the fourth semiconductor circuits have a switching function, and
wherein the controller performs an opening and closing control of the first to the fourth semiconductor circuits.

11. The DC/DC converter according to claim 1,
wherein the controller is provided with
a first calculator that calculates a first calculation value which changes a basis ON duty ratio,
a second calculator that calculates a second calculation value which changes the ON duty ratio difference in the Δduty control,
a third calculator that calculates a third calculation value which changes the phase difference in the phase shift control, and
a switching controller that controls an ON duty ratio and a phase of ON period of each of the semiconductor circuits, based on the first calculation value, the second calculation value, and the third calculation value, and
wherein the third calculator calculates a value obtained by performing processing which reverses a positive or negative sign alternately at half period of a switching period to the calculated third calculation value, as the final third calculation value, and
wherein the switching controller calculates a first triangular wave which oscillates between a minimum value and a maximum value at the switching period, and a second triangular wave whose a phase is inverted 180 degrees to the first triangular wave;
based on a comparison result between a first control value which added the second calculation value and the third calculation value to the first calculation value, and the first triangular wave, the switching controller controls a switching operation of one or both of the first semiconductor circuit and the fourth semiconductor circuit; and
based on a comparison result between a second control value which subtracted the second calculation value from the first calculation value and added the third calculation value, and the second triangular wave, the switching controller controls a switching operation of one or both of the second semiconductor circuit and the third semiconductor circuit.

12. The DC/DC converter according to claim 11, further comprising a limiter that performs a lower limitation of the first control value by the minimum value and performs an upper limitation of the first control value by the maximum value, and performs a lower limitation of the second control value by the minimum value and performs an upper limitation of the second control value by the maximum value.

13. The DC/DC converter according to claim 1,
wherein the controller changes a current command value flowing into the charge and discharge capacitor so that a voltage detection value of the charge and discharge capacitor approaches a voltage command value of the charge and discharge capacitor; and changes the ON duty ratio difference based on the current command value, and changes the phase difference based on the current command value.

14. The DC/DC converter according to claim 13,
wherein the controller distributes the current command value to a current command value for the Δduty control and a current command value for the phase shift control; and changes the ON duty ratio difference based on the current command value for the Δduty control, and changes the phase difference based on the current command value for the phase shift control.

15. The DC/DC converter according to claim 14,
wherein in the case of performing an upper and lower limitation to one or both of the ON duty ratio difference and the phase difference, the controller distributes a part, which exceeded an upper and lower limitation value in the phase difference or the ON duty ratio difference to which the upper and lower limitation was performed, to the current command value for the Δduty control or the phase shift control corresponding to the phase difference or the ON duty ratio difference to which the upper and lower limitation is not performed.

16. The DC/DC converter according to claim 14,
wherein in the case where a temporary set value of the phase difference, which is temporarily set corresponding to the current command value, is upper and lower limited, the controller distributes a part of the current command value corresponding to a part which exceeded an upper and lower limitation value in the temporary set value of the phase difference, to the current command value for the Δduty control, and distributes a remaining part of the current command value to the current command value for the phase shift control.

17. The DC/DC converter according to claim 14, further comprising a reactor current detector that detects a current flowing through the reactor,
wherein the controller changes a distribution ratio between the current command value for the Δduty control and the current command value for the phase shift control in accordance with the current of the reactor detected by the reactor current detector; and
in the case where the current of the reactor detected by the reactor current detector is within a preliminarily set stop range of the Δduty control including 0, the controller sets the distribution ratio of the current command value for the Δduty control to the current command value, to 0,
in the case where the current of the reactor is outside the stop range, the controller sets the distribution ratio of the current command value for the Δduty control to the current command value, to a value larger than 0.

* * * * *